US012642626B2

(12) United States Patent
Dorfinger et al.

(10) Patent No.: US 12,642,626 B2
(45) Date of Patent: Jun. 2, 2026

(54) PALATAL EXPANSION APPLIANCES AND METHODS OF PRODUCING AND USING THE SAME

(71) Applicant: Align Technology, Inc., San Jose, CA (US)

(72) Inventors: Peter Dorfinger, Woodside, CA (US); Jennifer Marie Chavez, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 853 days.

(21) Appl. No.: 17/951,885

(22) Filed: Sep. 23, 2022

(65) Prior Publication Data

US 2023/0100712 A1 Mar. 30, 2023

Related U.S. Application Data

(60) Provisional application No. 63/248,194, filed on Sep. 24, 2021.

(51) Int. Cl.
| | |
|---|---|
| *A61C 7/10* | (2006.01) |
| *A61C 7/08* | (2006.01) |
| *C08L 75/06* | (2006.01) |
| *B33Y 80/00* | (2015.01) |

(52) U.S. Cl.
CPC ................. *A61C 7/10* (2013.01); *A61C 7/08* (2013.01); *C08L 75/06* (2013.01); *B33Y 80/00* (2014.12); *C08L 2203/02* (2013.01)

(58) Field of Classification Search
None
See application file for complete search history.

(56) References Cited

U.S. PATENT DOCUMENTS

| | | | |
|---|---|---|---|
| 5,820,368 | A | 10/1998 | Wolk |
| 5,885,073 | A * | 3/1999 | Kussick ................... A61C 7/08 |
| | | | 128/848 |
| 5,975,893 | A | 11/1999 | Chishti et al. |
| 6,183,248 | B1 | 2/2001 | Chishti et al. |
| 6,309,215 | B1 | 10/2001 | Phan et al. |
| 6,386,864 | B1 | 5/2002 | Kuo |
| 6,450,807 | B1 | 9/2002 | Chishti et al. |
| 6,454,565 | B2 | 9/2002 | Phan et al. |
| 6,471,511 | B1 | 10/2002 | Chishti et al. |
| 6,524,101 | B1 | 2/2003 | Phan et al. |
| 6,572,372 | B1 | 6/2003 | Phan et al. |
| 6,607,382 | B1 | 8/2003 | Kuo et al. |
| 6,705,863 | B2 | 3/2004 | Phan et al. |

| | | | |
|---|---|---|---|
| 6,749,414 | B1 | 6/2004 | Hanson et al. |
| 6,783,604 | B2 | 8/2004 | Tricca |
| 6,790,035 | B2 | 9/2004 | Tricca et al. |
| 6,814,574 | B2 | 11/2004 | Abolfathi et al. |
| 6,830,450 | B2 | 12/2004 | Knopp et al. |
| 6,947,038 | B1 | 9/2005 | Anh et al. |
| 7,074,039 | B2 | 7/2006 | Kopelman et al. |
| 7,104,792 | B2 | 9/2006 | Taub et al. |
| 7,121,825 | B2 | 10/2006 | Chishti et al. |
| 7,160,107 | B2 | 1/2007 | Kopelman et al. |
| 7,192,273 | B2 | 3/2007 | McSurdy, Jr. |
| 7,347,688 | B2 | 3/2008 | Kopelman et al. |
| 7,354,270 | B2 | 4/2008 | Abolfathi et al. |
| 7,448,514 | B2 | 11/2008 | Wen |
| 7,481,121 | B1 | 1/2009 | Cao |
| 7,543,511 | B2 | 6/2009 | Kimura et al. |
| 7,553,157 | B2 | 6/2009 | Abolfathi et al. |
| 7,600,999 | B2 | 10/2009 | Knopp |
| 7,658,610 | B2 | 2/2010 | Knopp |
| 7,766,658 | B2 | 8/2010 | Tricca et al. |
| 7,771,195 | B2 | 8/2010 | Knopp et al. |
| 7,854,609 | B2 | 12/2010 | Chen et al. |
| 7,871,269 | B2 | 1/2011 | Wu et al. |
| 7,878,801 | B2 | 2/2011 | Abolfathi et al. |
| 7,878,805 | B2 | 2/2011 | Moss et al. |
| 7,883,334 | B2 | 2/2011 | Li et al. |
| 7,892,474 | B2 | 2/2011 | Shkolnik et al. |
| 7,914,283 | B2 | 3/2011 | Kuo |
| 7,947,508 | B2 | 5/2011 | Tricca et al. |
| 8,152,518 | B2 | 4/2012 | Kuo |

(Continued)

FOREIGN PATENT DOCUMENTS

| | | | | |
|---|---|---|---|---|
| JP | 7675662 | B2 * | 5/2025 | ........... B29C 51/002 |
| WO | WO-2015075094 | A1 | 5/2015 | |

(Continued)

OTHER PUBLICATIONS

Triad Visible light Cure system product disclosure from Dentsply Sirona. [online]. [retrieved on Dec. 7, 2025]. Retrieved from URL:<https://www.dentsplysirona.com/content/dam/dentsply/pim/manufacturer/Prosthetics/Removable/Denture_Base/Visible_Light_Cure_VLC/Triad_Air_Barrier/Triad-4185-B_Rev10.pdf>(Year: 2017).*

(Continued)

*Primary Examiner* — Sanza L. McClendon

(74) *Attorney, Agent, or Firm* — Seed Intellectual Property Law Group LLP

(57) ABSTRACT

The present disclosure provides multi-material orthodontic appliances useful for expanding a palate or arch of a patient, and, in some case, moving one or more teeth of the patient from a first to a second location according to a treatment plan. Further provided herein are methods for producing and using such multi-material orthodontic appliances on an individualized basis where each appliance is tailored to the specific treatment requirements of a patient.

20 Claims, 14 Drawing Sheets

(56) References Cited

U.S. PATENT DOCUMENTS

| | | | |
|---|---|---|---|
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 * | 6/2021 | Kuo ......................... A61C 7/08 |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 * | 3/2022 | Shanjani ................ B33Y 50/02 |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,750 B2 | 2/2023 | Kopelman et al. |
| 11,576,752 B2 | 2/2023 | Morton et al. |
| 11,589,955 B2 | 2/2023 | Medvinskaya et al. |
| 11,596,502 B2 | 3/2023 | Webber et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,661,468 B2 * | 5/2023 | Cole ......................... A61C 7/10 |
| | | 264/401 |
| 11,666,415 B2 | 6/2023 | Wang et al. |
| 11,851,510 B2 * | 12/2023 | Carter ...................... C08F 2/50 |
| 11,974,897 B2 * | 5/2024 | Shanjani ................ B33Y 50/02 |
| 11,974,898 B2 * | 5/2024 | Shanjani ................ A61C 7/023 |
| 12,343,938 B2 * | 7/2025 | Meenakshisundaram .................. |
| | | B29C 64/223 |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | DeSimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0061974 A1 | 3/2014 | Tyler |
| 2014/0067334 A1 | 3/2014 | Kuo |
| 2014/0265034 A1 | 9/2014 | Dudley |
| 2015/0102532 A1 | 4/2015 | DeSimone et al. |
| 2016/0193014 A1 | 7/2016 | Morton et al. |
| 2017/0007359 A1 | 1/2017 | Kopelman et al. |
| 2017/0135793 A1 | 5/2017 | Webber et al. |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0046297 A1 | 2/2019 | Kopelman et al. |
| 2019/0099129 A1 | 4/2019 | Kopelman et al. |
| 2019/0125497 A1 | 5/2019 | Derakhshan et al. |
| 2019/0262101 A1 | 8/2019 | Shanjani et al. |
| 2019/0298494 A1 | 10/2019 | Webber et al. |
| 2020/0000553 A1 | 1/2020 | Makarenkova et al. |
| 2020/0155276 A1 | 5/2020 | Cam et al. |
| 2020/0188062 A1 | 6/2020 | Kopelman et al. |
| 2020/0214598 A1 | 7/2020 | Li et al. |

(56) References Cited

U.S. PATENT DOCUMENTS

| | | |
|---|---|---|
| 2020/0253696 A1 | 8/2020 | Raby et al. |
| 2021/0147672 A1 | 5/2021 | Cole et al. |

FOREIGN PATENT DOCUMENTS

| | | |
|---|---|---|
| WO | WO-2016078838 A1 | 5/2016 |
| WO | WO-2018032022 A1 | 2/2018 |

OTHER PUBLICATIONS

Tumbleston J.R., et al., "Continuous Liquid Interface Production of
3D Objects," Science, 2015, vol. 347(6228), pp. 1349-1352.

* cited by examiner

Figure 1C:
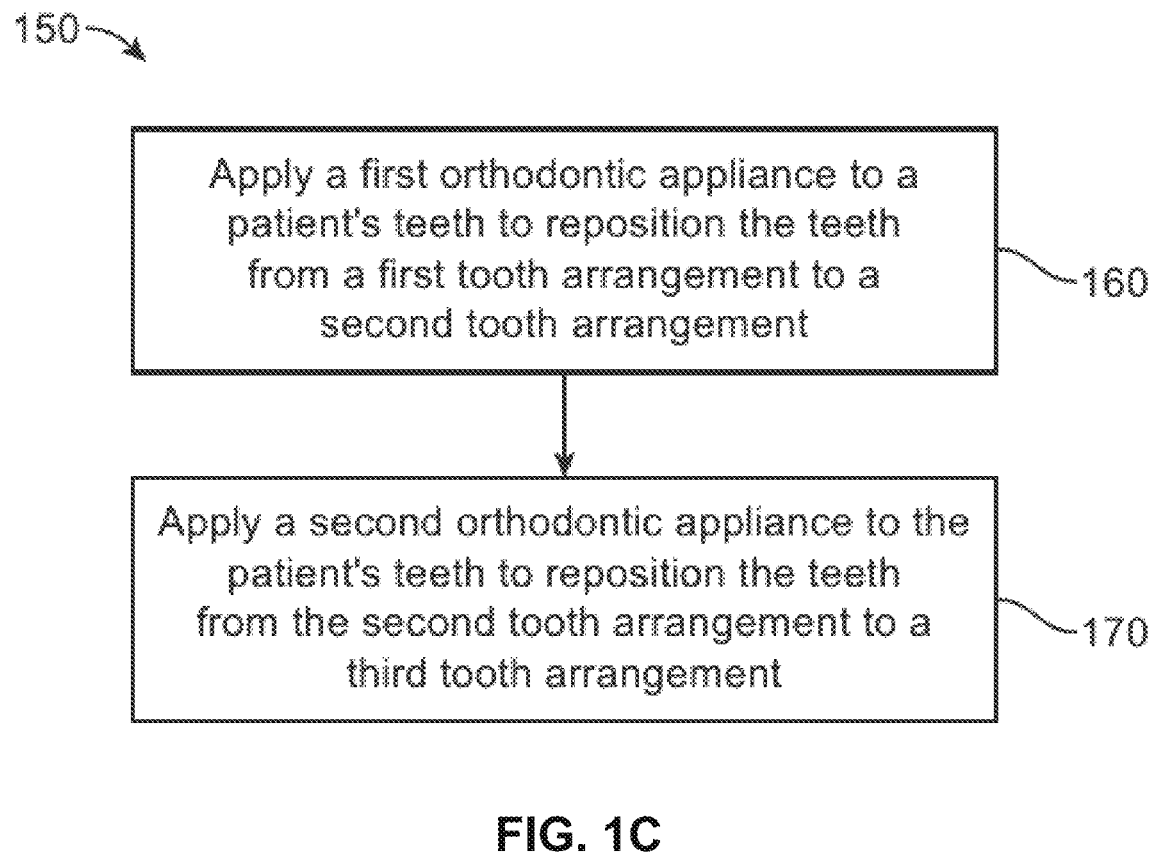

150

Apply a first orthodontic appliance to a patient's teeth to reposition the teeth from a first tooth arrangement to a second tooth arrangement — 160

Apply a second orthodontic appliance to the patient's teeth to reposition the teeth from the second tooth arrangement to a third tooth arrangement — 170

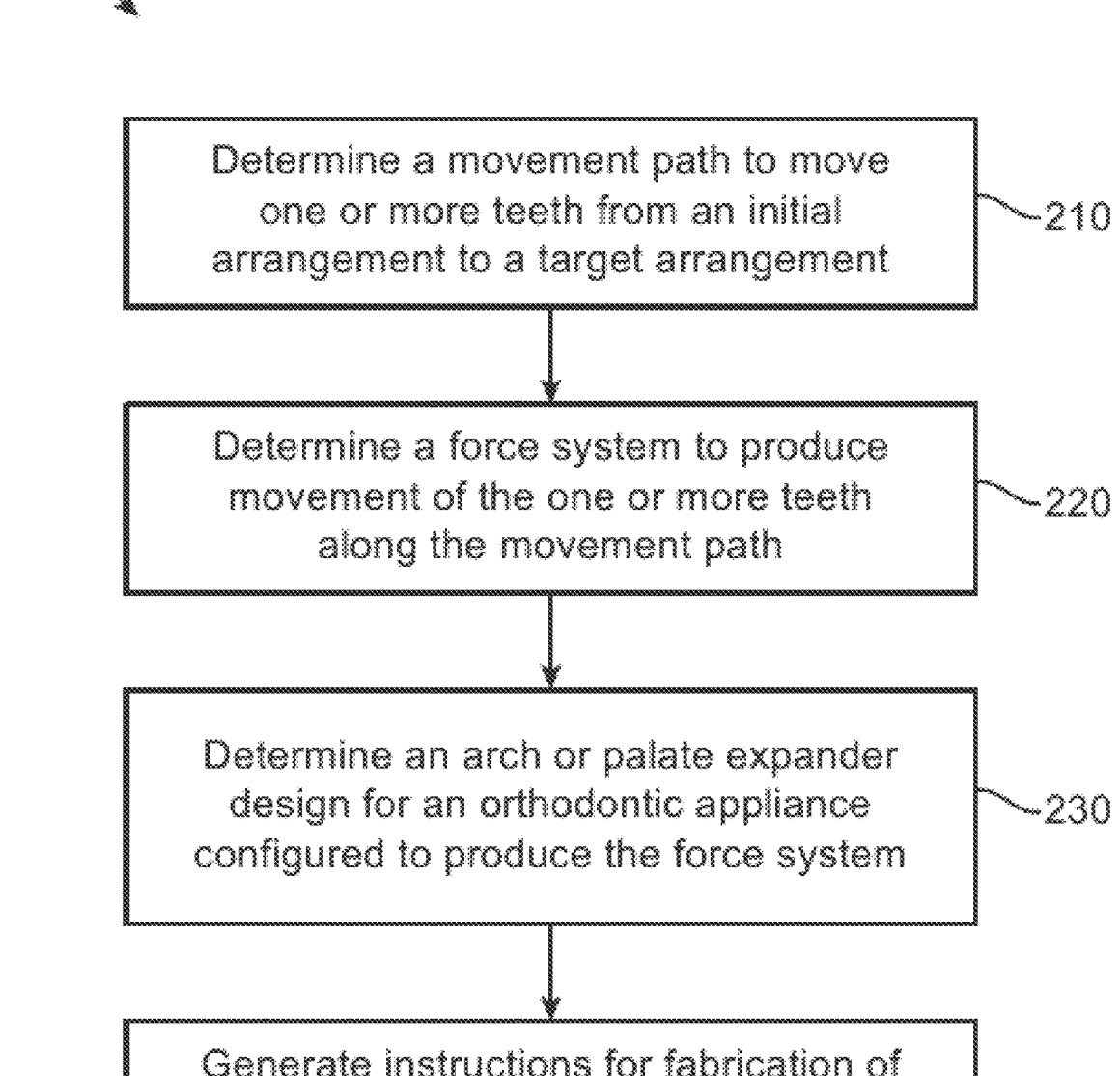

Determine a movement path to move one or more teeth from an initial arrangement to a target arrangement ~210

Determine a force system to produce movement of the one or more teeth along the movement path ~220

Determine an arch or palate expander design for an orthodontic appliance configured to produce the force system ~230

Generate instructions for fabrication of the orthodontic appliance incorporating the arch or palate expander design ~240

Receive a digital representation of a patient's teeth — 310

Generate one or more treatment stages based on the digital representation of the teeth — 320

Fabricate at least one orthodontic appliance based on the generated treatment stages — 330

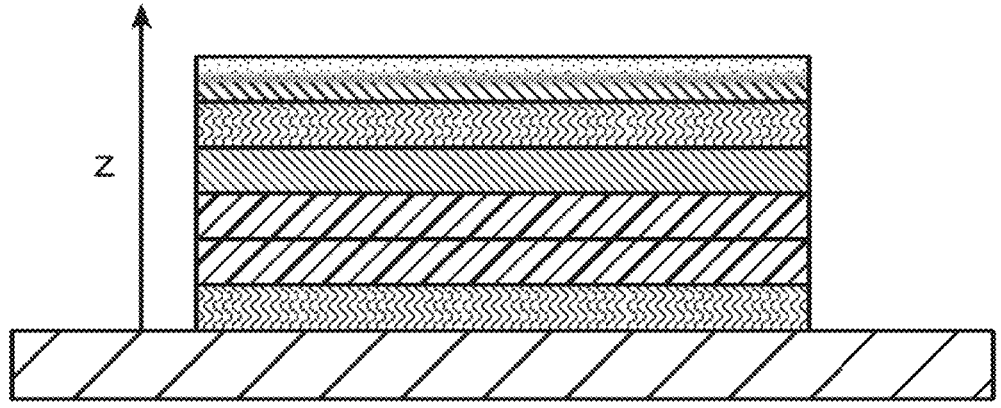
Vertical Dimension
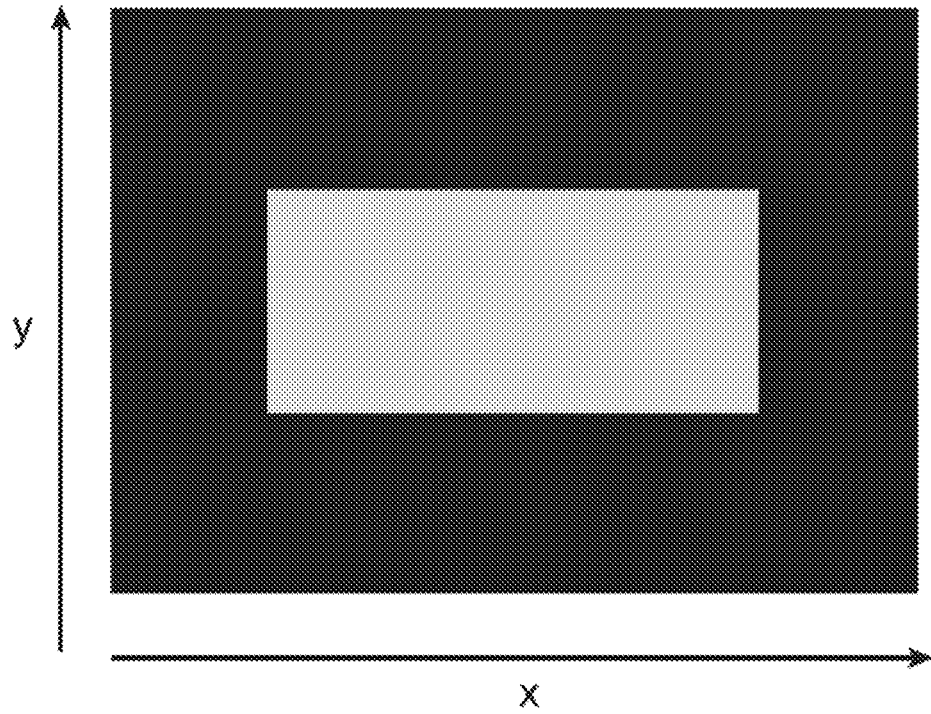
Lateral Dimensions
FIG. 5

• Possible Gate locations

PALATAL EXPANSION APPLIANCES AND METHODS OF PRODUCING AND USING THE SAME

CROSS-REFERENCE TO RELATED APPLICATION

This application claims the priority of U.S. Provisional Patent Application No. 63/248,194, filed on Sep. 24, 2021, which is hereby incorporated by reference in its entirety

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Dental appliances for expanding the arch and/or palate of a patient often must withstand several insertion and removal cycles while providing appropriate mechanical properties for palate expansion. Hence, new compositions and methods for producing appliances for expanding the arch or palate of a patient are needed, e.g., to provide tailored mechanical properties that allow an individualized treatment regimen.

SUMMARY OF THE INVENTION

In various aspects, the present disclosure provides a multi-material orthodontic appliance, comprising: a shell comprising a first material, wherein the shell contains: a teeth-receiving portion; and a palatal portion comprising a cavity; and a second material located in the cavity. In some instances, a first portion of the first material is a photo-cured polymeric material. In some instances, the first portion corresponds to at least 10%, 20%, 30%, 40%, 50%, 60%, 70%, 80%, or at least 90% by weight of the first material. In some instances, a second portion of the first material is a thermo-cured polymeric material. In some instances, the second portion corresponds to at most 90%, 80%, 70%, 60%, 50%, 40%, 30%, 20%, or at most 10% by weight of the first material. In some instances, the first material comprises an interpenetrating polymer network (IPN). In some instances, the second material is a polymeric material comprising a thermo-cured polymer, a photo-cured polymer, or a combination thereof. In some instances, the first material is characterized by one or more of the following properties: (A) a tensile modulus of at least 200 MPa, 400 MPa, 600 MPa, 800 MPa, 1,000 MPa, 1,200 MPa, 1,400 MPa, or 1,600 MPa; (B) an elongation at break of at least 10%, 20%, 30%, 40%, 50%, 60%, 70%, 80%, 90%, 100%, 110%, 120%, 130%, 140%, 150%, or at least 160%; (C) a flexural modulus remaining of 10 MPa or more, 20 MPa or more, 50 MPa or more, 60 MPa or more, 70 MPa or more, 80 MPa or more, 90 MPa or more, 100 MPa or more, 125 MPa or more, 150 MPa or more, 175 MPa or more, 200 MPa or more, 225 MPa or more, 250 MPa or more, 275 MPa or more, 300 MPa or more, or 350 MPa or more, after 24 hours in a wet environment at 37° C.; (D) a water uptake of less than 25 wt %, less than 15 wt %, or less than 10 wt %, when measured after 24 hours in a wet environment at 37° C.; (E) is bioinert, biocompatible, or a combination thereof; and (F) comprises a plurality of polymeric phases, wherein at least one polymeric phase of the one or more polymeric phases has a $T_g$ of at least 60° C., 80° C., 90° C., 100° C., or at least 110° C. In some instances, the first material is characterized by two or more of the properties (A), (B), (C), (D), (E) and (F). In some instances, the first material is characterized by three or more of the properties (A), (B), (C), (D), (E) and (F). In some instances, the first material is characterized by four or more of the properties (A), (B), (C), (D), (E) and (F). In some instances, the first material is characterized by five or more of the properties (A), (B), (C), (D), (E) and (F). In some instances, the first material is characterized by all the properties (A), (B), (C), (D), (E) and (F). In some instances, the second material is characterized by one or more of the following properties: (G) a flexural modulus of at least 70 MPa, 80 MPa, 90 MPa, 100 MPa or more in a standard 0.78 mm flat sheet geometry; (H) a tensile modulus of at least 300 MPa, at least 400 MPa, at least 500 MPa, at least 600 MPa, or at least 700 MPa; and (I) a water uptake of less than 25 wt %, less than 15 wt %, or less than 10 wt %, when measured after 24 hours in a wet environment at 37° C. In some instances, the second material is characterized by two or more of the properties (G), (H), and (I). In some instances, the second material is characterized by all of properties (G), (H), and (I). In some instances, the shell is capable of being 3D printed. In some instances, the second material has greater than 40% conversion of double bonds to single bonds compared to the unpolymerized resin, as measured by FTIR. In some instances, at least 50%, 70%, 90%, 95%, or at least 97% of visible light passes through the first photo-cured portion of the first material. In some instances, at most 30%, 20%, 10%, or at most 5% of visible light passes through the second thermo-cured portion of the first material. In some instances, the teeth-receiving portion of the shell has a thickness of at least 200 μm and not more than 1,000 μm. In some instances, the palatal portion of the shell has a thickness of at least 1 mm and not more than 7 mm. In some instances, the palatal portion comprises an opening configured to allow placement of the second material, or an unpolymerized form thereof, into the cavity. In some instances, the opening is located on an occlusal surface or a flat edge of the cavity. In some instances, the opening has a diameter of at least 0.5 mm, 1 mm, 2 mm 3 mm, 5 mm, 10 mm, 20 mm, or at least 30 mm. In some instances, the opening has a diameter that is at least 50%, 70%, or 90% of the horizontal width of the palatal portion. In some instances, the second material is capable of chemically interacting with the first material of the inner surface of the cavity. In some instances, the inner surface of the cavity has a roughness of at least 0.5 μm, 10 μm, 20 μm, or at least 50 μm. In some instances, the roughness of the inner surface of the cavity is configured to enhance the chemical interaction between the first and the second material. In some instances, the chemical interaction comprises van-der-Waals interaction, hydrogen bonding, pi-stacking, or a combination thereof. In some instances, the second material further comprises a component capable of reducing shrinkage during curing. In some instances, the component comprises hard particles, chopped fibers, or a combination thereof. In some instances, the teeth engagement portion comprises a plurality of cavities shaped to receive a patient's teeth. In some instances, the orthodontic appliance is a palatal expander or an incremental palatal expander.

Further provided herein is, in some aspects, a method of fabricating a multi-material orthodontic appliance, the method comprising: producing a shell using a first material, wherein the shell comprises a teeth engagement and a palatal portion, and wherein the palatal portion comprises a cavity; and filling a portion of the cavity with a second material. In some instances, the portion corresponds to at least 10%, 20%, 40%, 60%, 80%, 90%, 95%, or at least 99% of the volume of the cavity. In some instances, producing the shell comprises additive manufacturing. In some instances, the additive manufacturing comprising using DLP/SLA, inkjet, SLS, multi jet fusion, or a combination thereof. In some instances, such method further comprises, subsequent to producing the shell, post-curing the shell. In some instances, such method further comprises cleaning the shell. In some instances, cleaning the shell comprises using a centrifuge, a solvent, or a combination thereof. In some instances, filling of the second material into the cavity comprises pouring, injecting, syringing, or a combination thereof. In some instances, during the filling step, the second material has a temperature from 20° C. but not more than 120° C. In some instances, the temperature of the second material during the filling step is higher than the glass transition temperature ($T_g$) of the first material of the shell. In some instances, temperature of the second material during the filling step is lower than the glass transition temperature ($T_g$) of the first material of the shell. In some instances, the method can further comprise, subsequent to filling the portion of the cavity with the second material, curing the second material inside the cavity. In some instances, the curing comprises thermo-curing, curing using a cationic initiator, or a combination thereof. In some instances, the method can further comprise, during or subsequent to the curing step, interacting the second material with the first material of the inner surface of the cavity. In some instances, the method can further comprise cooling the cured second material in the cavity. In some instances, after cooling, the cured second material has a shrinkage of less than about 5% compared to the unpolymerized second material. In some instances, the teeth-receiving portion of the shell is produced with a thickness of at least 200 µm and not more than 1,000 µm. In some instances, the palatal portion of the shell is produced with a thickness of at least about 1 mm and not more than 7 mm. In some instances, the method can further comprise, prior to producing the shell, generating a 3D model of the multi-material orthodontic appliance based on the anatomy of a patient's oral cavity. In some instances, the volume and geometry of the cavity is tailored to the patient's treatment plan. In some instances, producing the shell comprises mass-producing a plurality of shells. In some instances, each shell of the plurality of shells is tailored to a patient's treatment plan. In some instances, the multi-material orthodontic appliance is a palatal expander or an incremental palatal expander.

In various aspects, provided herein is a method of fabricating a multi-material orthodontic appliance, the method comprising: producing a shell using a first material, the shell comprising a teeth engagement and a palatal portion, wherein the palatal portion comprises a cavity and wherein the producing comprises: photo-curing a first portion of the first material; and filling a portion of the cavity with a second material. In some instances, the method further comprises, following photo-curing of the first portion of the first material, thermo-curing a second portion of the first material. In some instances, the method further comprises, following filling the portion of the cavity with the second material, curing the second material inside the cavity. In some instances, curing the second material comprises thermo-curing. In some instances, thermo-curing the second material and thermo-curing the second portion of the first material occurs simultaneously. In some instances, thermo-curing the second material and thermo-curing the second portion of the first material occurs subsequently. In some instances, the portion of the cavity corresponds to at least 10%, 20%, 40%, 60%, 80%, 90%, 95%, or at least 99% of the volume of the cavity. In some instances, producing the shell comprises additive manufacturing. In some instances, the additive manufacturing comprising using DLP/SLA, inkjet, SLS, multi jet fusion, or a combination thereof. In some instances, the method further comprises, subsequent to producing the shell, post-curing the shell. In some instances, the method further comprises, cleaning the post-cured shell. In some instances, cleaning the shell comprises using a centrifuge, a solvent, or a combination thereof. In some instances, the filling of the second material into the cavity comprises pouring, injecting, syringing, or a combination thereof. In some instances, during the filling step, the second material has a temperature from 20° C. but not more than 120° C. In some instances, the temperature of the second material during the filling step is higher than the glass transition temperature ($T_g$) of the first material of the shell. In some instances, the temperature of the second material during the filling step is lower than the glass transition temperature ($T_g$) of the first material of the shell. In some instances, the method further comprises, during or subsequent to the thermo-curing step, interacting the second material with the second portion of the first material of the inner surface of the cavity. In some instances, the method further comprises, cooling the cured second material in the cavity. In some instances, after cooling, the cured second material has a shrinkage of less than about 5% compared to the unpolymerized second material. In some instances, wherein the teeth-receiving portion of the shell is produced with a thickness of at least 200 µm and not more than 1,000 µm. In some instances, the palatal portion of the shell is produced with a thickness of at least about 1 mm and not more than 7 mm. In some instances, the method further comprises, prior to producing the shell, generating a 3D model of the multi-material orthodontic appliance based on the anatomy of a patient's oral cavity. In some instances, the volume and geometry of the cavity is tailored to the patient's treatment plan. In some instances, producing the shell comprises mass-producing a plurality of shells. In some instances, each shell of the plurality of shells is tailored to a patient's treatment plan. In some instances, the multi-material orthodontic appliance is a palatal expander or an incremental palatal expander.

DESCRIPTION OF THE FIGURES

FIG. 1C illustrates a method of orthodontic treatment using a plurality of appliances, in accordance with embodiments.

FIG. 2 illustrates a method for designing an orthodontic appliance, in accordance with embodiments.

FIG. 5 illustrates the lateral dimensions and vertical dimension as used herein.

DETAILED DESCRIPTION

I. Introduction

Figure 1A:
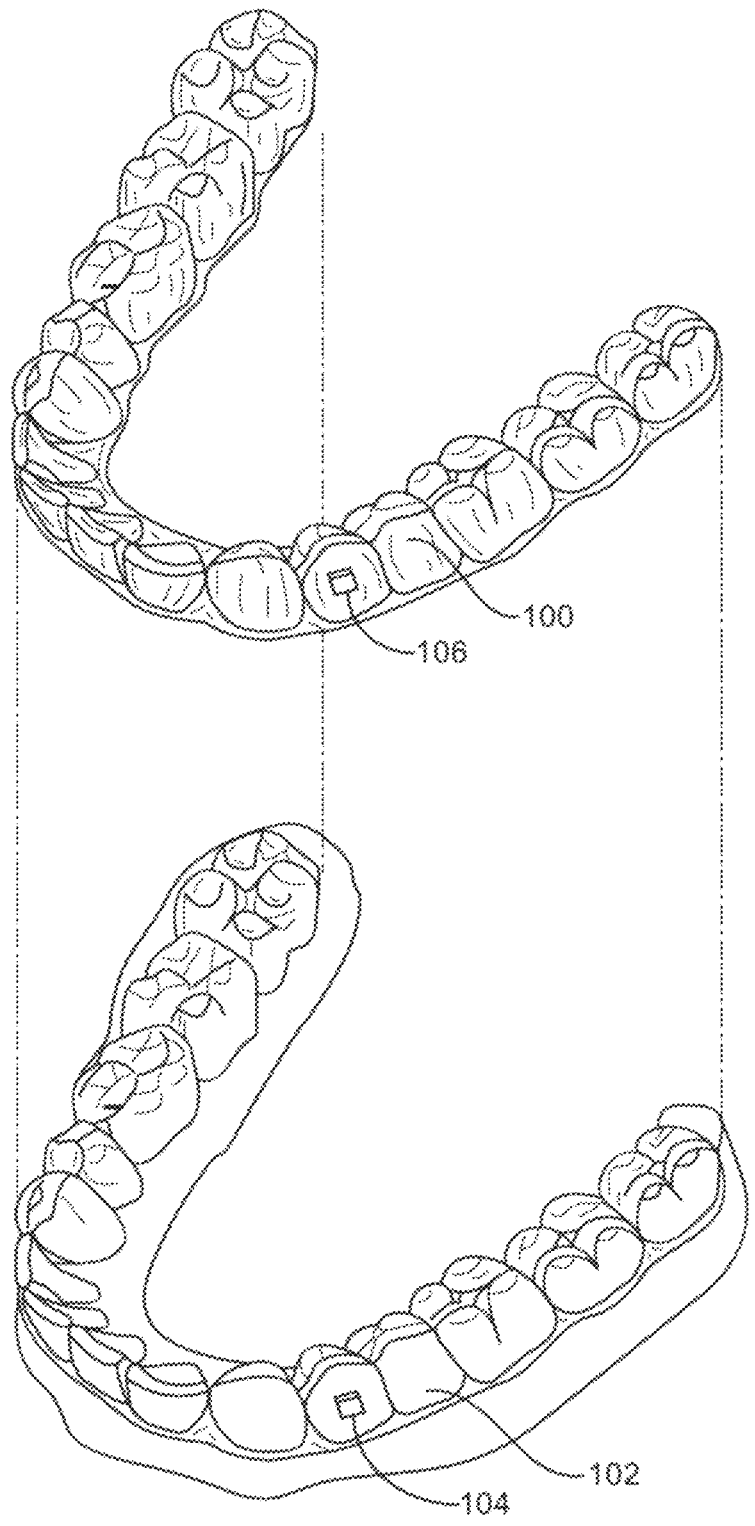
FIG. 1A illustrates a tooth repositioning appliance, in accordance with embodiments.

The present disclosure provides orthodontic appliances and methods of producing and using such appliances, and addresses an unmet need for improved, patient-specific appliances (e.g., palate expanders and arch expanders) having appropriate mechanical properties and a better fit with the anatomical structure of the oral cavity to meet a patient's specific needs, and which can be readily manufactured and/or mass-produced. In various instances, an orthodontic appliance described herein can be a palatal and/or arch expander used to expand a palate and/or arch of a patient. In some instances, such orthodontic appliance can comprise a shell. Such shell can comprise a teeth-receiving portion and a palatal portion. The palatal portion of the shell can comprise a cavity. In some instances, the shell comprises, consists essentially of, or consists of a first material. The cavity of the palatal portion of the shell can comprise a filling comprising or consisting of a second material. In various instances, the first material of the shell and the second material of the cavity filling can be different. Utilization of different materials for the shell and cavity filling can provide an appliance having mechanical properties superior to those of conventional devices consisting of a single material. Thus, a multi-material expander appliance of the present disclosure can deliver high (and remaining) forces during usage, while being flexible enough to endure and withstand several insertion and removal cycles by a user. Furthermore, the modular nature of the appliances described herein allows for a more streamlined and efficient production of the appliances, as further described herein.

Thus, in various instances, the present disclosure provides multi-material palatal expansion appliances comprising two or more different materials, and capable of providing (i) high remaining forces and stiffness during usage of the appliance by a patient for force exertion in the palatal region of the appliance, and (ii) a toughness of the overall appliance for multiple insertion and removal cycles. Hence, a palatal and/or arch expansion appliance of this disclosure can provide the mechanical and user-friendly properties that conventional devices may lack.

Generally, the term "palatal expansion appliance," as used herein, can be used interchangeably with terms such as "palatal expanders" or "expansion appliances," and generally includes appliances capable of expanding the palate and/or arch of a patient. In various instances, an expansion appliance of this disclosure can be used by a patient to expand the palate, the arch, or both. Appliances of the present disclosure may also be used to move one or more teeth of a patient.

All terms, chemical names, expressions, and designations have their usual meanings which are well-known to those skilled in the art, unless otherwise defined herein. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim.

It is noted that as used herein and in the appended claims, the singular forms "a", "an", and "the" include plural reference unless the context clearly dictates otherwise. Thus, for example, reference to "an appliance" includes a plurality of such appliances and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

Number ranges are to be understood as inclusive, i.e. including the indicated lower and upper limits. Furthermore, the term "about", as used herein, and unless clearly indicated otherwise, generally refers to and encompasses plus or minus 10% of the indicated numerical value(s). For example, "about 10%" may indicate a range of 9% to 11%, and "about 1" may include the range 0.9-1.1.

As used herein, the term "polymer" generally refers to a molecule composed of repeating structural units connected by covalent chemical bonds and characterized by a substantial number of repeating units (e.g., equal to or greater than 20 repeating units and often equal to or greater than 100 repeating units and often equal to or greater than 200 repeating units) and a molecular weight greater than or equal to 5,000 Daltons (Da) or 5 kDa, such as greater than or equal to 10 kDa, 15 kDa, 20 kDa, 30 kDa, 40 kDa, 50 kDa, or 100 kDa. Polymers are commonly the polymerization product of one or more monomer precursors. The term polymer includes homopolymers, i.e., polymers consisting essentially of a single repeating monomer species. The term polymer also includes copolymers which are formed when two or more different types of monomers are linked in the same polymer. Copolymers may comprise two or more monomer subunits, and include random, block, alternating, segmented, grafted, tapered and other copolymers. "Cross-linked polymers" refers to polymers having one or multiple links between at least two polymer chains, which can result from multivalent monomers forming cross-linking sites upon polymerization.

As used herein, the term "oligomer" generally refers to a molecule composed of repeating structural units connected by covalent chemical bonds and characterized by a number of repeating units less than that of a polymer (e.g., equal to or less than 10 repeating units) and a lower molecular weight than polymers (e.g., less than 5,000 Da or 2,000 Da). In some case, oligomers may be the polymerization product of one or more monomer precursors. In an embodiment, an oligomer or a monomer cannot be considered a polymer in its own right.

The average molecular weight (M) is the average number of repeating units n times the molecular weight or molar mass ($M_i$) of the repeating unit. The number-average molecular weight ($M_n$) is the arithmetic mean, representing the total weight of the molecules present divided by the total number of molecules.

The term "biocompatible," as used herein, refers to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

As used herein, the terms "rigidity" and "stiffness" can be used interchangeably, as are the corresponding terms "rigid" and "stiff." As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

II. Multi-Material Palatal Expansion Appliances

The present disclosure provides appliances for expanding the palate and/or arch of a patient. Such expansion devices can comprise a plurality of (i.e., two or more) different materials as described herein. In some embodiments, an appliance herein is a multi-material orthodontic appliance, comprising: (i) a shell, comprising a teeth-receiving portion, and a palatal portion comprising a cavity, wherein the shell comprises a first material; and (ii) a second material located in the cavity of the palatal portion of the shell. In some embodiments, the orthodontic appliance is a palatal expander. In other embodiments, the orthodontic appliance is a theroux retainer.

Properties of Multi-Material Expansion Appliances

A multi-material expander appliance of the present disclosure can have a variety of different properties and can be produced in various geometries and shapes. In some instances, an expander appliance of this disclosure, or a portion thereof such as a shell, can be fabricated based on three-dimensional (3D) data generated from the geometrie and/or anatomy of a patient's oral cavity. In various embodiments, an appliance shell can be capable of being fabricated using additive manufacturing techniques as described herein. Hence, in some instances, such shell can comprise or consist of a first material that is a polymeric material generated from a curable resin through curing, e.g., polymerization (such as photo-polymerization and/or thermal-polymerization). An appliance shell of this disclosure can comprise a cavity. Such cavity can be located in a palatal region of the shell, e.g., as exemplified in FIGS. 7A-7B and 8A-8B. Following production of the shell comprising a palatal cavity, e.g., by using additive manufacturing, a certain volume (e.g., about 10%, 20%, 30%, 40%, 50%, 60%, 70%, 80%, 90%, 95%, 97%, or 99%) of the palatal cavity can be filled with a second material. Such second material can be a curable (e.g., photo- and/or thermo-curable) material, such that, after the filling step, the second material can be cured inside the cavity. In some cases, the second material comprises or consists of a thermo-curable material or a photo-curable material. In various cases, the second material is a thermo-curable and not a photo-curable composition.

In some instances, an expander device of the present disclosure can provide a high stiffness and stress remaining of the palatal portion of the expander shell, while maintaining a high toughness of the overall appliance. In various embodiments of this disclosure, such properties, which can be opposing to those provided by appliances that solely contain a single material such as a photo-cured material (e.g., single material appliances), can be provided by using an appliance shell comprising a first material that can maintain a high toughness of the overall appliance, and a second material having a high stiffness, stress remaining forces, and flexural modulus (e.g., 60 MPa or higher) located in the palatal cavity of the appliance, thereby allowing the appliance to generate an outward force, e.g., for expanding an arch and/or palate of a patient.

In a cured state, an appliance shell can comprise a first material and the palatal cavity of such shell can comprise a second material, wherein the shell and the filled palatal cavity can have the same or different transparencies. In some cases, the cured first material and the cured second material have similar transparencies (e.g., >90% similarity), or essentially the same transparencies (e.g., >99% similarity) of light of at least one specific wavelength. In other instances, the cured first material and the cured second material have different transparencies (e.g., <70% similarity) of light of at least one specific wavelength, e.g., as shown in FIGS. 6A-6B. In some embodiments, about 10%, 20%. 30%, 40%, 50%, 60%, 70%, 80%, 90%, or 95% of visible light of at least one specific wavelength passes through the shell, wherein the shell comprises or consist of a first material. In some instances, at least about 70%, 80%, 90%, or 95% of visible light of at least one specific wavelength passes through the shell. In other embodiments, the shell has a low visible light transparency, e.g., less than about 20%, 10%, or less than about 5%, e.g, in instances in which the shell is thermo-cured. In some embodiments, about 5%, 10%, 20%. 30%, 40%, 50%, 60%, 70%, 80%, 90%, or 95% of visible light of at least one specific wavelength passes through a palatal portion of the shell comprising a cavity filled with a cured second material. In some instances, at most about 50%, 40%, 20%, 10%, or at most about 5% of visible light of at least one specific wavelength passes through the palatal portion of the shell.

In some instances, the cured first material and the cured second material have the same color. In other instances, the cured first material and the cured second material have different colors. As an example, in some cases, an appliance can be transparent and colorless, or alternatively can contain shades such as white or black and combinations thereof, whereas the cured second material inside the palatal cavity has a significantly lower transparency for light of the visible spectrum, can contain shades such as white or black and combinations thereof, and/or any color of the visible light spectrum.

Figure 7A:
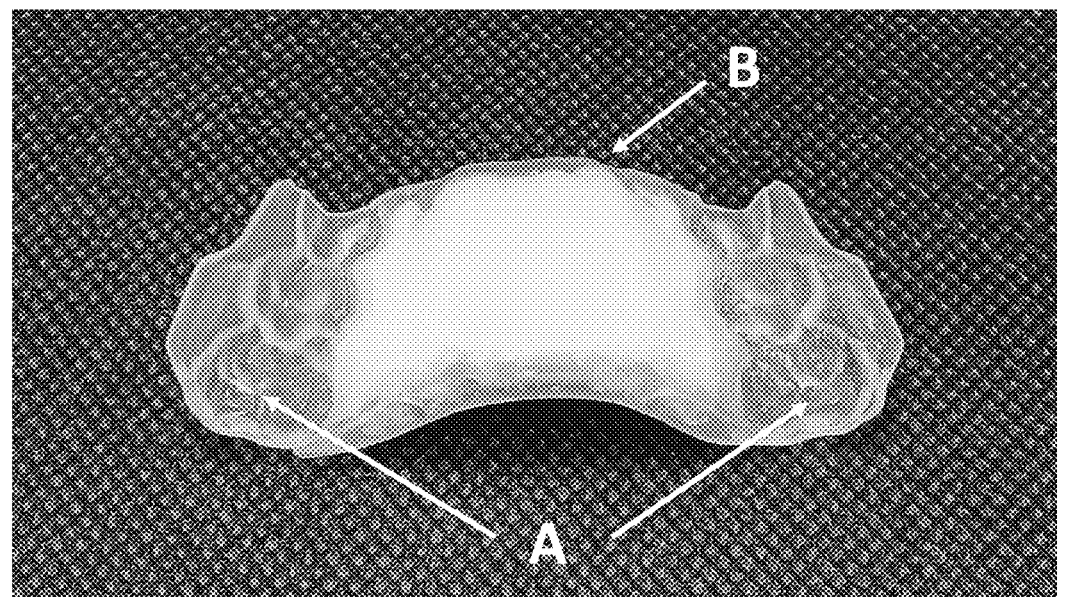
FIG. 7A illustrates an orthodontic appliance comprising a palatal expander portion, in accordance with embodiments of the present disclosure.
Figure 7B:
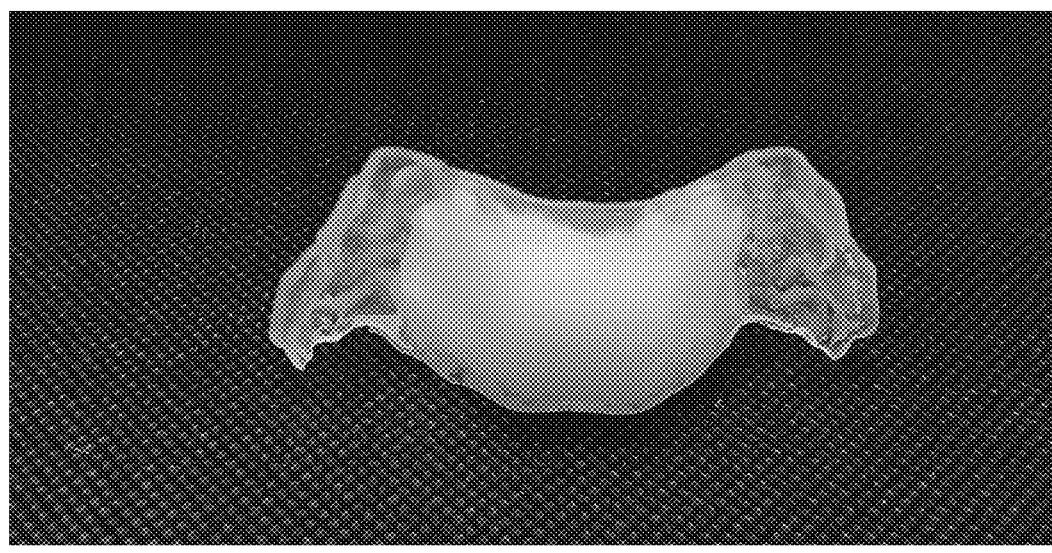
FIG. 7B illustrates an orthodontic appliance comprising a palatal expander portion, in accordance with embodiments of the present disclosure.

With reference to FIGS. 7A-7B, an expander appliance herein, or a portion thereof, can comprise a shell comprising a first material and a first transparency. The shell can comprise a teeth-receiving portion on either or both sides of a palatal portion (indicated by arrows "A" in FIG. 7A) to hold the appliance in place and/or move one or more teeth according to a treatment plan when used by a patient. Such appliance can further comprise a cavity within the palatal portion of the appliance shell. Such cavity can be filled with a second material (indicated by arrows "B" in FIG. 7A). The second material can be a curable resin, e.g., a thermo-curable resin. Once cured, e.g., polymerized, the second material can provide certain mechanical and physical properties useful in the expansion of a palate and/or arch of a patient. The second material can also, prior to and/or subsequent to curing, have a second transparency. As shown in FIGS. 7A-7B, in some embodiments herein, the shell comprising the first material can have a greater transparency of visible light than the cured second material located in the cavity of the palatal portion of the shell.

A cured first material that an appliance shell can comprise or consist of, can be characterized by one or more of the following properties: (A) a tensile modulus of at least about 100 MPa, 200 MPa, 400 MPa, 600 MPa, 800 MPa, 1,000 MPa, 1,200 MPa, 1,400 MPa, or 1,600 MPa; (B) an elongation at break of at least about 10%, 15%, 20%, 25%, 30%, 40%, 50%, 60%, 70%, 80%, 90%, 100%, 110%, 120%, 130%, 140%, 150%, or 160%; (C) a flexural modulus remaining of about 10 MPa or more, 20 MPa or more, 30 MPa or more, 50 MPa or more, 60 MPa or more, 70 MPa or more, 80 MPa or more, 90 MPa or more, 100 MPa or more, 125 MPa or more, 150 MPa or more, 175 MPa or more, 200 MPa or more, 225 MPa or more, 250 MPa or more, 275 MPa or more, 300 MPa or more, 325 MPa or more, or 350 MPa or more after 24 hours in a wet environment at 37° C.; (D) a water uptake of less than about 25 wt %, less than 15 wt %, less than 10 wt %, or less than about 5 wt %, when measured after 24 hours in a wet environment at 37° C.; (E) is bioinert, biocompatible, or a combination thereof and (F) comprises a photo-cured composition, a thermo-cured composition, or a combination thereof. In some instances, the cured first material is characterized by two or more of the properties (A), (B), (C), (D), (E) and (F). In some instances, the cured first material is characterized by three or more of the properties (A), (B), (C), (D), (E) and (F). In some instances, the cured first material is characterized by four or more of the properties (A), (B), (C), (D), (E) and (F). In some instances, the cured first material is characterized by five or more of the properties (A), (B), (C), (D), (E) and (F). In some instances, the cured first material is characterized by all of the properties (A), (B), (C), (D), (E) and (F).

A cured first material herein can further be characterized by comprising a plurality of polymeric phases, wherein at least one polymeric phase of the one or more polymeric phases has a $T_g$ of at least 60° C., 80° C., 90° C., 100° C., or at least 110° C. Such one or more polymeric phases (e.g., crystalline and/or amorphous phases) can be produced by polymerization-induced phase separation prior to and/or during the curing process.

A first material, prior to curing, may be characterized by a viscosity, e.g., a viscosity of less than about 30,000 cP, 20,000 cP, or less than about 15,000 cP, such as about 12,000 cP, 10,000 cP, 8,000 cP, or less. Such viscosity can provide for simpler and more effective cleaning steps after curing (e.g., including post-curing), and may allow for a higher dimensional accuracy of the overall appliance. However, once cured, e.g., photo- and/or thermo-cured, the first material can be sufficiently tough and hardened to withstand tooth movements and bites by a patient as well as multiple insertion and removal forces. The first material can furthermore be bioinert, biocompatible, or a combination thereof, as described herein.

A second material (e.g., a filling material) that can be placed into a palatal cavity of an appliance shell herein can be characterized, post-curing, by one or more of the following properties: (G) a flexural modulus of at least about 50 MPa, 60 MPa, 70 MPa, 80 MPa, 90 MPa, 100 MPa or more in a standard 0.78 mm flat sheet geometry; (H) a tensile modulus of at least about 200 MPa, 300 MPa, 400 MPa, 500 MPa, 600 MPa, or at least about 700 MPa; and (I) a water uptake of less than 25 wt %, less than 15 wt %, or less than 10 wt %, when measured after 24 hours in a wet environment at 37° C. In some instances, a cured second material is characterized by two or more of the properties (G), (H), and (I). In some instances, a cured second material is characterized by all the properties (G), (H), and (I).

In some embodiments, an uncured second material can comprise or consist of a thermo-curable resin, a photo-curable resin, or a combination thereof. In other embodiments, an uncured second material does not comprise or consist of a photo-curable resin. In some cases, a second material can comprise a component capable of reducing or preventing shrinkage during and/or after curing. Such component can include hard particles, chopped fibers, or a combination thereof.

In various cases herein, the second material, prior to curing, e.g., thermo-curing, can be characterized by a low melting point (e.g., less than about 70° C., 60° C., 50° C., 40° C., or less than 30° C.) and/or a low viscosity (e.g., less than about 30,000 cP, 20,000 cP, or less than about 10,000 cP). Such properties can simplify and increase the efficiency of the filling process of this second material into a palatal cavity of an expander shell. Furthermore, in various instances, the temperature of the second material, when placed into the cavity, can be below the glass transition temperature ($T_g$) of the cured first material of the shell to, e.g., reduce or prevent deformation of the shell geometry during the filling process. In other instances, the temperature of the second material, when placed into the cavity, can be above the glass transition temperature ($T_g$) of the cured first material of the shell, followed by rapid cooling upon filling into the cavity. As described herein, a second material can have minimal (e.g., less than about 5%, 2%, 1%, 0.5%, 0.25%, 0.1%, or 0.05% volume shrinkage) or no measurable shrinkage subsequent to curing (e.g., compared to the volume of the uncured second material) and cooling to environmental temperature (e.g., room and oral cavity temperature). In some cases, a second material, either prior to or subsequent to curing, may not have a significant hydrophobicity.

In some embodiments, the teeth-receiving portion of an appliance shell described herein can have a thickness from about 50 μm to about 2 mm, from about 100 μm to about 1.5 mm, from about 200 μm to about 1 mm, from about 200 μm to about 900 μm, from about 300 μm to about 800 μm, from about 400 μm to about 700 μm, or from about 500 μm to about 600 μm. In some embodiments, the teeth-receiving portion of the shell has a thickness from about 100 μm, 200 μm, or 300 μm to about 700 μm, 800 μm, 900 μm, or 1,000 μm. A teeth-receiving portion of a shell described herein can comprise a plurality of cavities shaped to receive a patient's teeth.

A palatal portion of a shell can comprise a cavity, as described herein, which has a certain volume and is capable of receiving a second material, e.g., a filling, used to provide certain mechanical and physical properties to the palatal region of the shell. Such mechanical and physical properties can allow the palatal portion of an appliance to provide force-generating functions for expanding a palate and/or arch of a patient.

The polymeric material of the palatal portion of a shell, which palatal portion comprises a cavity, can have a thickness from about 1 mm to about 8 mm, from about 2 mm to about 7 mm, from about 1 mm to about 7 mm, from about 2 mm to about 6 mm, from about 2 mm to about 5 mm, from about 3 mm to about 6 mm, from about 4 mm to about 6 mm, or from about 5 mm to about 6 mm. In some embodiments, the palatal portion of the shell can have a thickness from about 1 mm to about 7 mm.

Figure 8A:
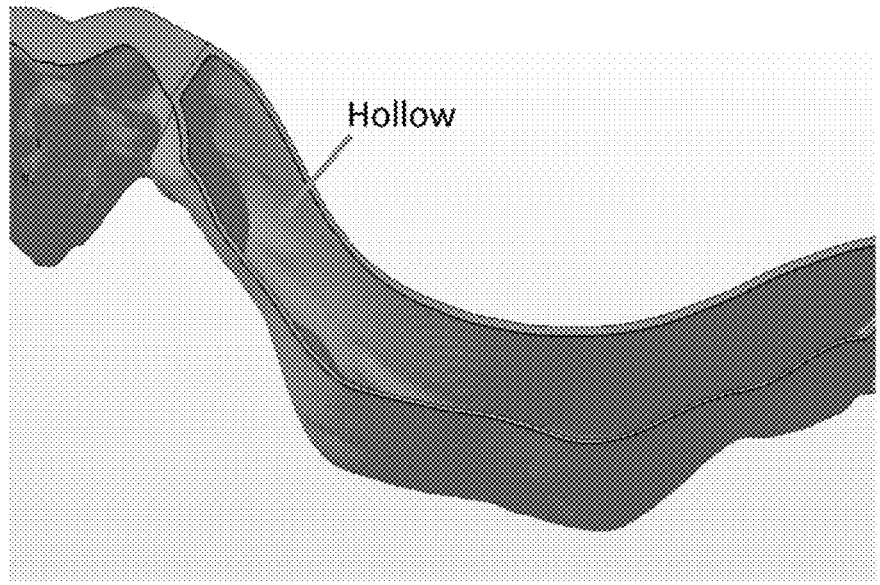
FIG. 8A illustrates an orthodontic appliance comprising a palatal expander portion, in accordance with embodiments of the present disclosure, in which a (hollow) cavity in the palatal portion of the expander shell is highlighted through the arrow.
Figure 8B:
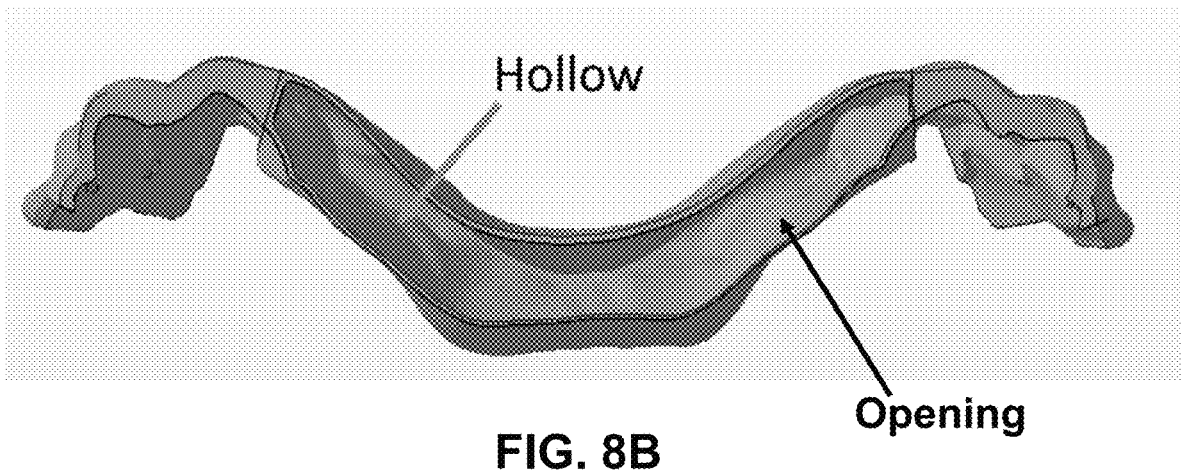
FIG. 8B illustrates an orthodontic appliance comprising a palatal expander portion, in accordance with embodiments of the present disclosure, in which a (hollow) cavity in the palatal portion of the expander shell is highlighted through the arrow.

The cavity of a palatal portion of a shell has a certain volume defined by the geometrie and dimensions of the palatal portion of the shell, e.g., as shown in FIGS. 8A-8B. Thus, a palatal cavity herein can have a volume from about 50 $mm^3$ to about 5000 $mm^3$, from about 150 $mm^3$ to about 4000 $mm^3$, from about 500 $mm^3$ to about 3000 $mm^3$, from about 750 $mm^3$ to about 2500 $mm^3$, from about 950 $mm^3$ to about 2000 $mm^3$, from about 1000 $mm^3$ to about 1500 $mm^3$, or from about 100 $mm^3$ to about 1200 $mm^3$. In some instances, a palatal portion of an appliance herein (e.g., palatal shell+cavity) can have a volume from about 2000 $mm^3$ to about 4000 $mm^3$ or from about 2000 $mm^3$ to about 3000 $mm^3$.

In various instances, the palatal portion of a shell, which comprises the cavity, can further comprise one or more openings or a gates, through which a second material can be placed into the cavity, and/or through which a gas occupying the cavity prior to filling can exit the cavity when replaced by the second material. The opening(s) or gate(s) can have a certain diameter. The diameter can be from about 1 mm to about 5 mm, from about 2 mm to about 4 mm, or from about 2 mm to about 3 mm. In other instances, the opening has a diameter that is at least about 30%, 40%, 50%, 70%, or 90% of the horizontal width of the palatal portion, see, e.g., FIG. 8B. The one or more openings of a palatal region of shell can be located on various surfaces and/or edges of the palatal portion of the shell that encloses or surrounds the cavity. In some instances, such one or more openings can be located on an occlusal surface of the cavity, a flat edge of the cavity, or a combination thereof. In some instances, such one or more openings can be located on an occlusal surface of the cavity. In some instances, such one or more openings can be located on a flat edge of the cavity.

In various embodiments, the second material can be capable of binding to the first material of the inner surface of the cavity. Such binding can occur once the second material has been placed into the cavity, during curing of the second material in the cavity, subsequent to curing, or any combination thereof. In some instances, the binding occurs during the curing step, and to some degree subsequent to the curing step. The curing of the second material can be thermo-curing.

In some embodiments herein, a first material can comprise both a photo-curable composition and a thermo-curable composition, and a second material can be a thermo-curable composition. In such instances, and following photo-curing of the photo-curable portion of the first material, the thermo-curable second portion of the first material and the thermo-curable second material inside the palatal cavity of the partially-cured (e.g., photo-cured) shell can be thermo-cured. Such simultaneous or nearly simultaneous thermo-curing can enhance binding between the first material of the shell and the second material inside the cavity. Other embodiments of the present disclosure also encompass simultaneous or nearly simultaneous photo-curing of a portion of the first material and a second material, e.g., in instances where a first portion of an uncured first material is thermo-cured (instead of photo-cured).

Thus, binding between a first material (e.g., of the inside of a palatal cavity) and a second material located inside the cavity can include chemical binding, mechanical binding, or a combination thereof, and can occur at ambient temperature, elevated (e.g., curing) temperatures, and/or during the cooling process after curing. Chemical binding can comprise various forms of chemical interactions, including van-der-Waals, dipole-dipole (e.g., hydrogen bonding), pi stacking, or a combination of these interactions. Binding between the second material and the first material of the shell can provide orthodontic appliances with certain mechanical and/or physical properties that may be superior to those of conventional devices, as described herein.

In some instances, the inner surface of a palatal cavity of a shell, or a portion thereof, that can come in contact with a second material when placed into the cavity can have a certain roughness. As used herein, the term "roughness" in the context of an appliance surface can generally be defined as either (i) a height difference between two or more locations or areas of the surface (e.g., the height difference between two points or areas A and B on the surface), and/or (ii) an increase in surface area relative to a flat or smooth surface (e.g., via pins, cravings, etc. which can be introduced during 3D printing). A flat or smooth surface can generally be defined herein as having less than about 0.5 μm height different between any two locations or surface areas on such surface. Thus, generally, a roughness of a surface can be defined by a height, e.g., the maximum height difference between any two points or locations on the surface. Hence, in some instances, an inner surface of a palatal portion of a shell can have a roughness from about 0.1 μm to about 50

μm, from about 0.2 μm to about 15 μm, from about 0.5 μm to about 10 μm, from about 0.8 μm to about 10 μm, from about 1 μm to about 8 μm, from about 2 μm to about 7 μm, from about 3 μm to about 6 μm, from about 4 μm to about 5 μm. In such instances, a surface herein (e.g., an inner surface of a palatal cavity) can have a roughness of about 0.5 μm, 2 μm, 5 μm, 10 μm, 15 μm, 20 μm, 25 μm, 30 μm, 40 μm, or about 50 μm, or more.

In some embodiments, binding between a second material (e.g., a cured second material) and an inner surface of a palatal cavity that comprises a first material (e.g., a cured first material) can be increased or enhanced when such inner surface has a roughness, compared to the same surface that does not comprise such roughness (e.g., a flat or smooth surface). In some instances, such roughness can be from about 0.1 μm to about 50 μm, from about 0.2 μm to about 15 μm, from about 0.5 μm to about 10 μm, from about 0.8 μm to about 10 μm, from about 1 μm to about 8 μm, from about 2 μm to about 7 μm, from about 3 μm to about 6 μm, or from about 4 μm to about 5 μm. In such cases, binding between a second material and an inner cavity surface having a roughness of at least about 1 μm can be increased by about 5%, 10%, 15%, 20%, 25%, 30%, 40%, 50%, 60%, 70%, 80%, 90%, or 95% compared to using non-rough or flat surface. This can be the case for cured materials as well as in cases where the second material is being cured, or is being cooled after a thermocuring process.

Compositions Used in Multi-Material Expansion Appliances

As described herein, the present disclosure provides multi-material palatal expander appliances with advantageous and superior properties compared to conventional devices, e.g., single-material appliances. Such advantageous and superior properties of the appliances described herein can, at least in part, be provided by using at least two different materials for producing such appliances, e.g., by using an appliance shell comprising a first material, and a second material that is placed into a cavity located in the palatal portion of the appliance shell.

In some instances, a shell can be, at least in part, composed of a polymeric material generated by photo-curing a photo-curable resin or composition. In various cases, the second material is not or does not comprise or consist of a photo-curable composition. Instead, such second material can comprise or consist of a material that can be cured by other mechanisms, e.g., elevated temperature, pressure, chemical initiators, or combinations thereof. In other embodiments, a shell can comprise a first material comprising a photo-curable portion and a thermo-curable portion, and the second material can either be photo- or thermo-curable. In such cases, provided herein are appliance shells comprising a first material comprising a photo-curable portion and a thermo-curable portion, and a second material comprising or consisting of a thermo-curable composition (or resin). In such instances, a first portion of the first material, e.g., the photo-curable portion of the first material, can be cured first, followed by placing a thermo-curable second material inside a palatal cavity of the shell, and then thermo-curing the second, thermo-curable portion of the first material and the second material simultaneously.

In some embodiments, a second material used herein to fill (e.g., partially or fully) a palatal cavity of an expander shell can comprise or consist of a thermo-curable composition that generates, upon exposure to a certain temperature or temperature range, a thermoplastic material. Such thermoplastic material can provide a suitable force remaining in the palatal region of an expander shell as described herein. However, such thermoplastic may, if used by itself, not generate sufficient tensile modulus to provide sufficient stiffness to expand a palate and/or arch of a patient. Hence, combining such thermoplastic material in the palatal region with a high tensile modulus shell, e.g., one produced via photo-curing and/or thermo-curing and additive manufacturing, can provide an appliance that is able to generate sufficient outward facing force to expand a palate and/or arch of a patient, while being sufficiently robust to withstand multiple insertion and removal cycles and bites when worn by a patient. Other embodiments of the present disclosure provide photo- and/or thermo-cured appliance shells and photo-cured second materials inside a palatal cavity.

In some embodiments, a first material of the present disclosure can comprise or consist of a polymeric material generated through photo-curing of a photo-curable resin. A polymeric material provided herein can be biocompatible, bioinert, or a combination thereof. The first polymeric material can comprise a polymeric structure comprising one or more polymeric phases, such as one or more amorphous phases, one or more crystalline phases, or a combination thereof, produced by polymerization-induced phase separation. In other embodiments, a first material of the present disclosure can comprise or consist of a polymeric material generated in part through photo-curing of a photo-curable resin and in part of thermo-curing a thermo-curable resin.

Cured polymeric materials of the present disclosures, e.g., a cured first and/or a cured second material can comprise one or more interpenetrating polymer network(s) (IPNs).

In some aspects, a photo-curable composition or resin herein (e.g., a first and/or second material, or portions thereof) can be cured by exposing such composition or resin to electromagnetic radiation of appropriate wavelength. Such curing or polymerization can induce phase separation in the photo-curable composition and/or in the forming polymeric material. Such polymerization-induced phase separation can occur along one or more lateral and vertical direction(s) (see, e.g., FIG. 5). Polymerization-induced phase separation can generate one or more polymeric phases in the resulting polymeric material. A photo-curable composition undergoing polymerization and polymerization-induced phase separation can comprise one or more photo-polymerizable compounds of the present disclosure. Thus, in some cases, at least one polymeric phase of the one or more polymeric phases generated during curing and present in the resulting polymeric material can comprise, in a polymerized form, at least one of the one or more photo-polymerizable compounds. In an example, a photo-curable resin comprising one photo-polymerizable compounds species is cured by exposure to electromagnetic radiation of appropriate wavelength. The cured polymeric material comprises 2 polymeric phases A and B. In some cases, at least one of the phases A or B can comprise the photo-polymerizable compound as a component in its polymeric structure. In some cases, both phases A and B can comprise the photo-polymerizable compound as a component in their polymeric structure. The phases A and B can comprise the photo-polymerizable compound in different amounts or concentrations. Thus, in some cases herein, two or more phase that comprise a photo-polymerizable compound and/or monomer of this disclosure can be separated by a concentration gradient of such compound and/or monomer.

A polymeric phase of a polymeric material of the present disclosure can have a certain size or volume. In some embodiments, a polymeric phase is 3-dimensional, and can have at least one dimension with less than 1000 μm, less than 500 μm, less than 250 μm, less than 200 μm, less than 150 μm, less than 100 μm, less than 90 μm, less than 80 μm, less than 70 µm, less than 60 µm, less than 50 µm, less than 40 µm, less than 30 µm, less than 20 µm, or less than 10 µm. In certain embodiments, the polymeric phase can have at least two dimensions with less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In certain embodiments, the polymeric phase can have three dimensions with less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In some instances, a polymeric material comprises an average polymeric phase size of less than about 5 µm in at least one spatial dimension.

In various aspects, the present disclosure provides a polymeric material that can comprise one or more polymeric phases, wherein at least one polymeric phase of the one or more polymeric phases is a crystalline phase. In various aspects, the present disclosure provides a polymeric material that can comprise one or more polymeric phases, wherein at least one polymeric phase of the one or more polymeric phases is an amorphous phase. In some instances, provided herein is a polymeric material that can comprise two or more polymeric phases, wherein at least one polymeric phase of the one or more polymeric phases is a crystalline phase, and at least one polymeric phase of the one or more polymeric phases an amorphous phase.

In some embodiments, a polymeric material herein comprises a ratio of crystalline polymeric phases to amorphous polymeric phases (wt/wt) of greater than about 1:10, greater than about 1:9, greater than about 1:8, greater than about 1:7, greater than about 1:6, greater than about 1:5, greater than about 1:4, greater than about 1:3, greater than about 1:2, greater than about 1:1, greater than about 2:1, greater than about 3:1, greater than about 4:1, greater than about 5:1, greater than about 6:1, greater than about 7:1, greater than about 8:1, greater than about 9:1, greater than about 10:1, greater than about 20:1, greater than about 30:1, greater than about 40:1, greater than about 50:1, or greater than about 99:1. In some embodiments, the polymeric material comprises a ratio of the crystallizable polymeric material (wt/wt) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the polymeric material comprises a ratio of crystalline polymeric phases to amorphous polymeric phases (wt/wt) of between 1:9 and 99:1, between 1:9 and 9:1, between 1:4 and 4:1, between 1:4 and 1:1, between 3:5 and 1:1, between 1:1 and 5:3, or between 1:1 and 4:1.

The photo-curable resin used to generate the polymeric material of an appliance shell herein, or a first portion thereof (e.g., when a second portion is thermo-cured), can comprise one or more photo-polymerizable components. Such one or more photo-polymerizable components can include one or more telechelic oligomers, one or more telechelic polymers, one or more species of polymerizable monomers (e.g., reactive diluents), or a combination thereof. In such instances, a telechelic oligomer can have a number-average molecular weight of greater than 500 Da (0.5 kDa) but less than 10 kDa. A telechelic polymer can have a number-average molecular weight of greater than 10 kDa but less than 50 kDa. Polymerizable monomers herein can have a molecular weight from about 50 Da, 100 Da, or 200 Da to about 500 Da, 600 Da, or 700 Da. The telechelic oligomer(s) and/or polymer(s) can comprise photoreactive moieties at their termini. In some cases, the photoreactive moiety can be an acrylate, methacrylate, vinyl acrylate, vinyl methacrylate, allyl ether, silene, alkyne, alkene, vinyl ether, maleimide, fumarate, maleate, itaconate, or styrenyl moiety. In some cases, the photoreactive moiety can be an acrylate or a methacrylate. A telechelic polymer herein can include polyurethanes, polyesters, block copolymers or any other commercial polymers with reactive (e.g., photo-reactive) end groups.

A photo-curable resin described herein can further comprise one or more photoinitiators. Such photoinitiator, when activated with light of an appropriate wavelength (e.g., UV/VIS) can initiate a polymerization reaction (e.g., during photo-curing) between the telechelic polymers, monomers, and other potentially polymerizable components that may be present in the photo-curable resin, to form a polymeric material as further described herein. Generally, photoinitiators described in the present disclosure can include those that can be activated with light and initiate polymerization of the polymerizable components of the formulation. A "photoinitiator", as used herein, may generally refer to a compound that can produce radical species and/or promote radical reactions upon exposure to radiation (e.g., UV or visible light).

In some embodiments, a photo-curable resin of the present disclosure can further comprise a crosslinking modifier (e.g., in addition to a polymerizable monomer that can act as a cross-linker, or in instances where the polymerizable monomer does not act as a cross-linker), a light blocker, a solvent, a glass transition temperature modifier, or a combination thereof.

Portion(s) of a first material and a second material (or portions thereof) of the present disclosure can comprise a 2-component resin, a thermal curable resin, a resin with a cationic initiator for a cationic reaction, or a combination thereof. In some embodiments, a portion of a first material and a second material comprise or consist of a thermocurable resin. In other embodiments, a second material comprises or consists of a thermo-curable resin.

A second material herein can further comprise one or more fillers. Such fillers can include hard particles, chopped fibers, and other filler materials such as rubber, etc. In some instances, such filler(s) can lower the amount and/or likelihood of material shrinkage, e.g., during a curing process. Fillers can also include soft particles such as core-shell particles, rubber particles, (pre-)polymerized particles, and combinations thereof.

In some embodiments, a cavity of a palatal region of an expander appliance can further comprise support structures to reduce or prevent dimensional changes of the geometry of the cavity due to internal and/or external factors, e.g., varying temperature, moisture content, ph, etc., and/or to reduce or prevent shrinkage of a second material, e.g., during or after curing of the material in the cavity. In some instances, such support structure(s) can increase the green strength of a material and minimize warpage during printing, facilitate handling and/or post-processing such as solvent washing, centrifuging, etc.

III. Methods and Processes for Producing Multi-Material Expander Devices

Provided herein are methods and processes for designing and manufacturing an expander appliance (e.g., an incremental palatal expander or IPE) that address at least some of the challenges associated with conventional expander appliances. In some cases, such methods and processes can involve a first step for producing an appliance shell using a first material and additive manufacturing, and then fill a palatal cavity of such appliance shell with a second material, e.g., a thermo-curable composition, that, when cured (e.g., thermoplastic), can provide high stress remaining properties. In some instances, such method can comprise a first step comprising producing a shell, wherein such shell can comprise a teeth-receiving portion and a palatal portion, and wherein the palatal portion can comprise a cavity. The shell can be produced using additive manufacturing technologies using a first material. The first material can comprise a photo-reactive composition and hence can be photo-cured to produce a cured first polymeric shell material. In some instances, following production of a shell, the shell can be cleaned, e.g., to remove residual material leftover from the photo-curing process. Such cleaning can include mechanical cleaning or chemical cleaning, e.g., using one or more solvent(s). The additive manufacturing step for producing one or more appliance shells can be used to generate high quantities of a given appliance shell (e.g., mass production), and/or generate a plurality of appliance shells with varying geometries, e.g., in cases in which each appliance shell is tailored to fit a patient's oral cavity.

Following production of the shell, a filling (e.g., second material) can be placed (e.g., using various approaches, such as injection) into the cavity located within the palatal portion of the shell. Such filling can comprise or consist of a second material that is different from the first material the shell is composed of. The filling can, in some cases, be cured to adopt a final composition state. In some instances, such curing can include thermocuring, where a filling is placed into the cavity and subsequently thermocured to adopt, e.g., a polymeric, final state. In some cases, the filling can have a certain temperature, e.g., a temperature that is higher than room temperature, during the filling process. Such higher temperature can allow for a faster and more effective filling process. In other embodiments, a second material can be a photo-curable composition.

As described herein, in some embodiments, an orthodontic appliance (e.g., a palatal expander appliance) can be produced by first generating (e.g., 3D printing) a shell, wherein such shell comprises a palatal region and teeth-receiving portions on either side of the central palatal region, such palatal region comprising a cavity capable of receiving a second material, and the first material comprising one, two or more different compositions or portions, wherein such one, two or more different compositions or portions can be cured via different mechanisms. For instance, in some embodiments, a first material can have a first, photo-curable portion and a second, thermo-curable portions. In some instances, the second material that is placed into the palatal cavity of the shell can be thermo-curable. In such instances, a second portion of the first material and the second material (or at least a portion thereof) located inside the palatal shell cavity can be thermo-cured, either simultaneously or subsequently.

Hence, further provided herein is a method of fabricating a multi-material orthodontic appliance, the method comprising: producing a shell using a first material, the shell comprising a teeth engagement and a palatal portion, wherein the palatal portion comprises a cavity and wherein the producing comprises: photo-curing a first portion of the first material; and filling a portion of the cavity with a second material. Such method can further comprise, following photo-curing of the first portion of the first material, thermo-curing a second portion of the first material. In some instances, such method can further comprise, following filling the portion of the cavity with the second material, curing the second material inside the cavity. Hence, in some embodiments, the curing of the second material comprises thermo-curing. In such cases, thermo-curing of the second material (e.g., inside the cavity) and thermo-curing of the second portion of the first material (of the appliance shell) can occur simultaneously. In other embodiments, thermo-curing of the second material (e.g., inside the cavity) and thermo-curing the second portion of the first material occurs subsequently.

The methods and processes described herein for producing a multi-material expander appliance can provide advantages over conventional methods. Such advantages can include (i) minimal defects of excess filling of a second material into a palatal cavity; (ii) the transparency and/or color of the appliance can be varied when using multiple different materials, e.g., both the shell and cavity filling can be selected to be transparent to visible light, or be selected to have different visible and/or UV light transparencies (e.g., FIGS. 7A-7B); and (iii) high-throughput production of high quantities of expander appliances due to a modular production process comprising additive manufacturing of an appliance shell, following by the addition of a second material into a cavity of the shell and curing of such second material inside the cavity.

The modular nature of the appliances described herein and their production methods, can allow an appliance to be manufactured based on an individual patient's need, e.g., a customized appliance, while allowing mass-production of a plurality of individualized appliances due to available infrastructure for each manufacturing step. As an example, a plurality of expander appliances for use to expand an arch and/or palate of a plurality of patients can be manufactured in a two-step process in which a plurality of appliance shells (each tailored to fit a patient's cavity) can be manufactured using additive manufacturing techniques and a first material (e.g., a photo-curable composition), followed by filling the palatal cavities of the appliance shells with a second material. It can be envisioned that a first material used for the production of a plurality of shells can be identical or different for each shell, e.g., depending on the individual needs of each patient and the desired properties of each individual appliance shell. The same can apply for a second material. Thus, a second material used to fill a cavity of a plurality of appliance shells can be identical or different for each shell and patient, allowing to address the particular need of each patient. Similarly, the sizes and geometries of the shells and palatal cavities can be tailored for each individual patient to enhance performance and patient compliance. Thus, the expander appliances and their manufacturing processes described herein allow not only for a patient-specific design with unique properties tailored to address the individual needs of each patient, the production processes can be scaled to allow the in-parallel and/or in-sequence production of a plurality of expander appliances, wherein one or more of such expander appliances can be individualized appliances configured to expand the arch and/or palate of each patient in a specific and individualized manner.

An expander appliance of the present disclosure can be custom-designed and produced to align with a patient's treatment plan. In some instances, such expander appliance can have a specific shell thickness. The thickness of such shell can be homogeneous across the entire shell, or it can vary between different parts or portions of the shell. Hence, in some cases, a teeth-receiving portion of a shell can have a first thickness, and the region of the shell surrounding the cavity in the palatal region can have a second thickness. Modulation of the shell thickness in such one or more locations can be used to control the strength and direction of force generated by the appliance. In another example, controlling the volume of the palatal cavity of a shell, and/or the volume of material filled into such cavity enables the control of forces (e.g., modulus plus stress relaxation) exerted onto the patient.

Figure 9:
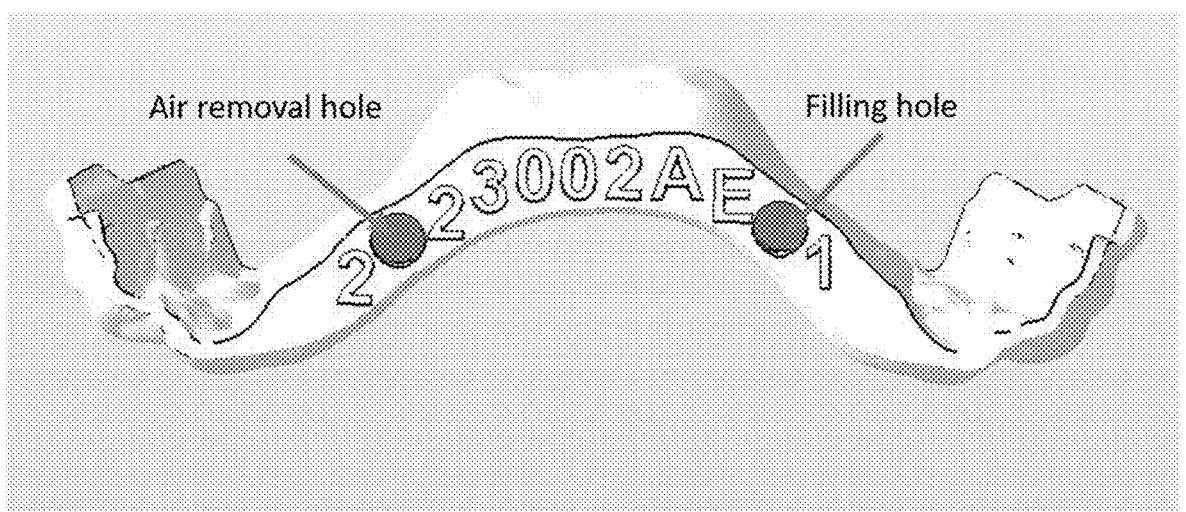
FIG. 9 illustrates an orthodontic appliance comprising a palatal expander portion, in accordance with embodiments of the present disclosure, in which a filling hole and an air removal hole are indicated through arrows.

In some embodiments, a process for manufacturing an expander appliance described herein can comprise generating a three-dimensional (3D) image or reconstruction of the anatomy and geometry of a patient's oral cavity, or a portion thereof. Based on the 3D data, an appliance shell comprising a teeth-receiving portion and a palatal cavity (e.g., as shown in FIGS. 7A-7B and 8A-8B) can be designed. The 3D data of the appliance shell can be used for additive manufacturing of the shell using a first material. The first material can be a photo-curable resin that is polymerized during the curing step to generate the polymeric material that forms the appliance shell. In instances where appliance shells need to be manufactured on a large scale, additive manufacturing can be used to efficiently produce a plurality of shells simultaneously (e.g., when using multiple printing devices at either the same or different locations). Such plurality of shells can either be identical or different, e.g., each being patient-specific and corresponding to the specific needs of a patient. Subsequently, the printed appliance shell can be cleaned, e.g., to remove excess and/or unreacted resin from interior and/or exterior portions of the appliance. A cleaning solution, mechanical cleaning, or a combination thereof, can be used to clean the appliance. In some cases, the cleaned appliance shell can be post-cured, e.g., to enhance the stability of the appliance. Post-curing can comprise an additional round of photo-curing, e.g., exposing the appliance to an additional round of electromagnetic radiation of appropriate wavelength (e.g., 300-700 nm) and, in some cases, an elevated temperature (e.g., 50-100° C.). The next step comprises placing a second material into the palatal cavity of the shell. Such placing can comprise pouring, injecting, syringing, a combination thereof, or any other method suitable for placing such second material into the cavity. In various cases, the second material is injected or syringed into the cavity. The second material can be placed into the cavity by pouring, injecting, and/or syringing the material through a gate located in the palatal region of the shell (e.g., FIGS. 9-11). As described herein, such gate can be located on an occlusal or lingual side of the palatal cavity. In some cases, e.g., as shown in FIG. 9, the palatal region of the shell that comprises the cavity can have more than one gate, e.g., a first gate used for placing a second material into the cavity (e.g., a filling gate), and a second gate to allow the gas (e.g., air) that is being replaced in the cavity by the second material, to exit the cavity. As disclosed herein, the second material can be a thermo-curable composition that can be a liquid during the step that places the material into the cavity to provide for an efficient placing or filling process. The second material can subsequently be cured inside the cavity, to provide the final multi-material expander appliance.

Figure 10:
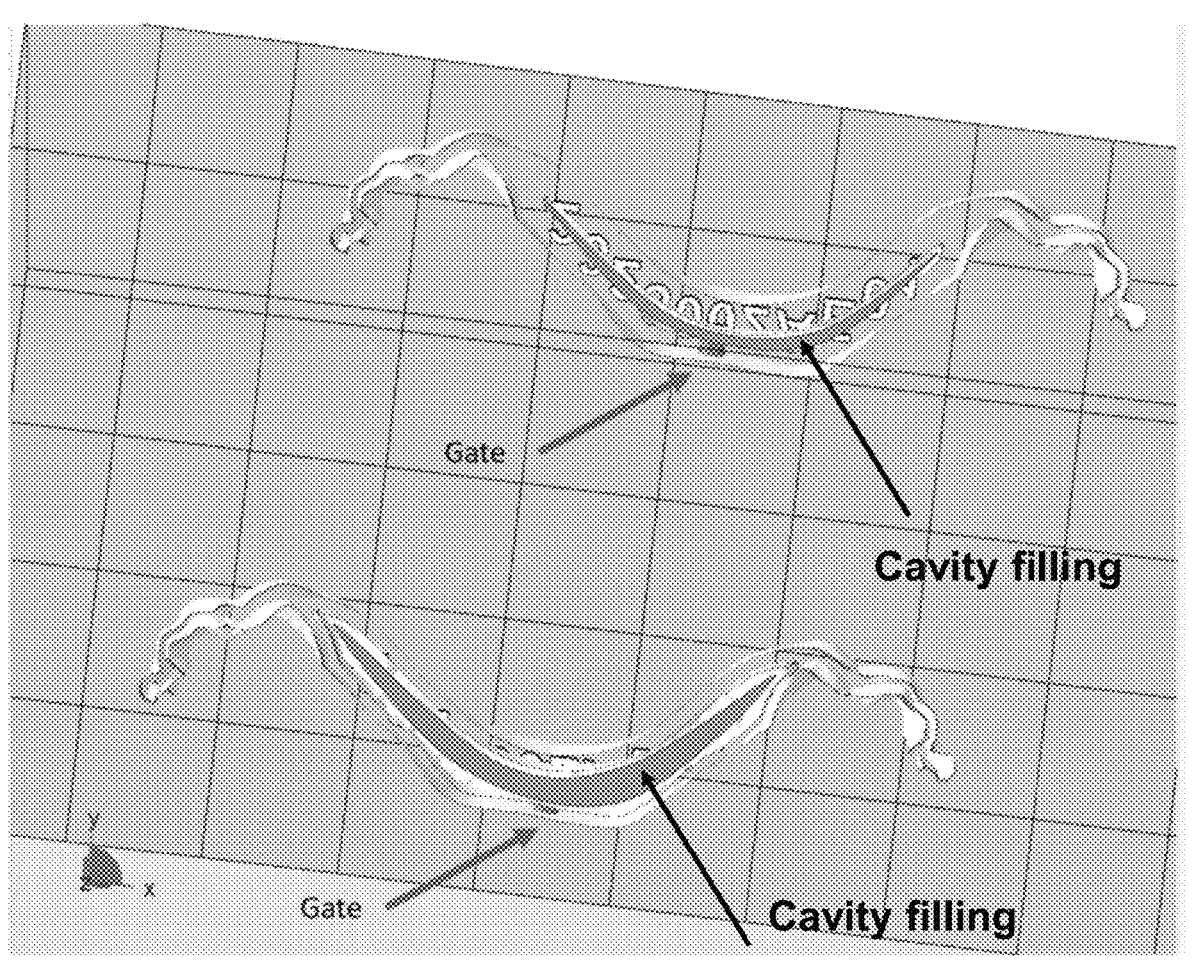
FIG. 10 illustrates orthodontic appliances comprising a palatal expander portion, in accordance with embodiments of the present disclosure, and in which each exemplary appliance comprises a different cavity volume, as indicated by the palatal filling and the corresponding arrows, and in which gates for inserting a filling are indicated through arrows.
Figure 11:
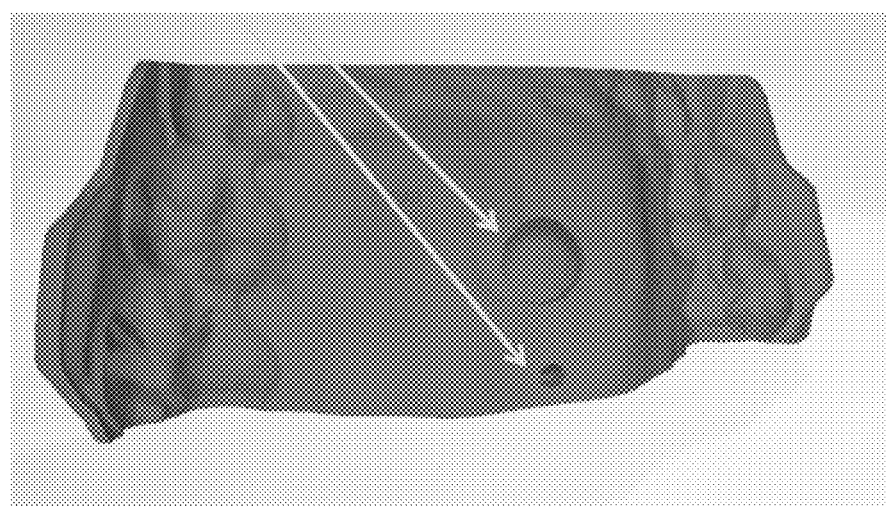
FIG. 11 illustrates an orthodontic appliance showing two possible locations and sizes for gates that can be used to fill the cavity of the palatal region of the shell with a filling, e.g., a second material, used to provide specific mechanical properties to the orthodontic appliance as described herein.

With reference to FIGS. 9-10, the shell of an expander appliance described herein can be defined by the exterior contour of the entire appliance, which, in the palatal region, surrounds the cavity in which a second material can be placed using methods described herein. FIG. 9 shows a front view of an expander appliance, indicating the presence of a filling hole and an air removal hole. FIG. 10, which shows a rear view of the appliance, indicates the volume of the palatal cavity with an arrow. As shown, the palatal region of the shell comprising the cavity may not extend to the wing or teeth-receiving region of the shell, though the overall shell geometry and cavity volume can depend on specific patient requirements, which allows tailoring the generating forces in an individualized manner. The thickness of the shell, particularly in the region surrounding the cavity, can be adjusted such that it can withstand the forces generating when the cavity is filled with a second material, and when the second material is cured and then cooled, e.g., from about 90° C. to about 30° C., and to avoid any significant structural changes during the manufacturing process. As shown in FIG. 10, the one or more gates can be located on a lingual side, or, as shown in FIG. 11, the one or more gates can be located on top of an occlusal surface, or the gate(s) can be located on the flat edge of the appliance. As described herein, the one or more gates can have a diameter that allows a liquid second material to enter the cavity, without impairing the structural integrity of the appliance.

Hence, the present disclosure provides multi-material dental appliances and methods for producing such appliances without the need for multi-material printers. Instead, commercial printers for additive manufacturing and existing infrastructure can be used to appliances of the present disclosure. Another advantage from a production point of view is the use of a different material to fill the palatal region of the appliance as it allows utilization of appliance shells with smaller cross-sections or thickness which in turn enables higher throughput productions.

Fabrication and Use of Orthodontic Appliances

The present disclosure provides methods for producing polymeric materials for appliance shells using curable resins described herein. In various embodiments, provided herein are methods for photo-curing photo-curable resins. Hence, in various instances, provided herein is a method of forming a polymeric appliance shell, the method comprising: (i) providing a photo-curable resin of the present disclosure; (ii) exposing the photo-curable resin to a light source; and curing the photo-curable resin to form the polymeric material.

In some embodiments, the photo-curing comprises a single curing step. In some embodiments, the photo-curing comprises a plurality of curing steps. In yet other embodiments, the photo-curing comprises at least one curing step which exposes the curable resin to light. Exposing the curable resin to light can initiate and/or facilitate photo-polymerization. In some instances, a photoinitiator can be used as part of the resin to accelerate and/or initiate photo-polymerization. In some embodiments, the resin is exposed to UV (ultraviolet) light, visible light, IR (infrared) light, or any combination thereof. In some embodiments, the cured polymeric material is formed from the photo-curable resin using at least one step comprising exposure to a light source, wherein the light source comprises UV light, visible light, and/or IR light. In some embodiments, the light source comprises a wavelength from 10 nm to 200 nm, from 200 nm to 350 nm, from 350 nm to 450 nm, from 450 nm to 550 nm, from 550 nm to 650 nm, from 650 nm to 750 nm, from 750 nm to 850 nm, from 850 nm to 1000 nm, or from 1000 nm to 1500 nm.

In some embodiments, a method of forming a polymeric material from a photo-polymerizable resin described herein can further comprise inducing phase separation in the forming polymeric material (i.e., during photo-curing), wherein such phase separation can be polymerization-induced. The polymerization-induced phase separation can comprise generating one or more polymeric phases in the polymeric material during photo-curing. In some cases, at least one polymeric phase of the one or more polymeric phases is an amorphous polymeric phase. Such at least one amorphous polymeric phase can have a glass transition temperature ($T_g$) of at least about 40° C., 50° C., 60° C., 80° C., 90° C., 100° C., 110° C. or at least about 120° C. In some cases, at least 25%, 50%, or 75% of polymeric phases generated during photo-curing have a glass transition temperature ($T_g$) of at least about 40° C., 50° C., 60° C., 80° C., 90° C., 100° C., 110° C. or at least about 120° C. In some instances, at least one polymeric phase that has the glass transition temperature ($T_g$) of at least about 40° C., 50° C., 60° C., 80° C., 90° C., 100° C., 110° C. or at least about 120° C. comprises, integrated in its polymeric structure (i.e., in a polymerized form), a polymerizable monomer. In some instances, at least one polymeric phase that has the glass transition temperature ($T_g$) of at least about 40° C., 50° C., 60° C., 80° C., 90° C., 100° C., 110° C. or at least about 120° C. comprises a polymerizable monomer. In various cases, at least one polymeric phase of the one or more polymeric phases generated during photo-curing comprises a crystalline polymeric material. Hence, in some cases, at least one polymeric phase of the one or more polymeric phases is a crystalline polymeric phase. The crystalline polymeric material (e.g., as part of a crystalline phase) can have a melting point of at least about 40° C., 50° C., 60° C., 80° C., 90° C., 100° C., 110° C. or at least about 120° C.

In some embodiments, a method of forming a polymeric material for an appliance shell from a photo-polymerizable resin described herein can further comprise initiating and/or enhancing formation of crystalline phases in the forming polymeric material. In certain embodiments, the triggering comprises cooling the cured material, adding seeding particles to the resin, providing a force to the cured material, providing an electrical charge to the resin, or any combination thereof. In some cases, polymer crystals can yield upon application of a strain (e.g., a physical strain, such as twisting or stretching a material). The yielding may include unraveling, unwinding, disentangling, dislocation, coarse slips, and/or fine slips in the crystallized polymer. In some embodiments, the methods disclosed herein further comprise the step of growing polymer crystals. As described further herein, polymer crystals comprise the crystallizable polymeric material.

In some embodiments, a polymerizable resin herein can be curable and have melting points <100° C. in order to be liquid and, thus, processable at the temperatures usually employed in currently available additive manufacturing techniques. As described herein, the polymerizable monomers of the present disclosure that are used as components in the curable resins can have a low vapor pressure at an elevated temperature compared to conventional reactive diluents or other polymerizable components used in curable resins. Such low vapor pressure of the monomers described herein can be particularly advantageous for use of such monomer in the curable (e.g., photocurable) compositions and additive manufacturing where elevated temperatures (e.g., 60° C., 80° C., 90° C., or higher) may be used. In various instances, a polymerizable monomer can have a vapor pressure of at most about 12 Pa at 60° C., or lower, as further described herein.

In some embodiments, a curable resin herein can comprise at least one photo-polymerization initiator (i.e., a photoinitiator) and may be heated to a predefined elevated process temperature ranging from about 50° C. to about 120° C., such as from about 90° C. to about 120° C., before becoming irradiated with light of a suitable wavelength to be absorbed by the photoinitiator, thereby causing activation of the photoinitiator to induce polymerization of the curable resin to obtain a cured polymeric material, which an optionally be cross-linked. In some embodiments, the curable resin can comprise at least one multivalent polymerizable monomer that can provide a cross-linked polymer.

In some embodiments, the methods disclosed herein for forming a polymeric material are part of a high temperature lithography-based photo-polymerization process, wherein a curable composition (e.g., a photo-curable resin) that can comprise at least one photo-polymerization initiator is heated to an elevated process temperature (e.g., from about 50° C. to about 120° C., such as from about 90° C. to about 120° C.). Thus, a method for forming a polymeric material according to the present disclosure can offer the possibility of quickly and facilely producing devices, such as orthodontic appliances, by additive manufacturing such as 3D printing using curable resins as disclosed herein.

Photo-polymerization can occur when a photo-curable resin herein is exposed to radiation (e.g., UV or visible light) of a wavelength sufficient to initiate polymerization. The wavelengths of radiation useful to initiate polymerization may depend on the photoinitiator used. "Light" as used herein includes any wavelength and power capable of initiating polymerization. Some wavelengths of light include ultraviolet (UV) or visible. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous or pulsed light during the process. Both the length of time the system is exposed to UV light and the intensity of the UV light can be varied to determine the ideal reaction conditions.

In some embodiments, the methods disclosed herein include the use of additive manufacturing to produce a device comprising the cured polymeric material. Such device can be an orthodontic appliance. The orthodontic appliance can be a dental aligner, a dental expander or a dental spacer. In certain embodiments, the methods disclosed herein use additive manufacturing to produce a device comprising, consisting essentially of, or consisting of the cured polymeric material. Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate an orthodontic appliance herein. In many embodiments, 3D printing involves jetting or extruding one or more materials (e.g., the crystallizable resins disclosed herein) onto a build surface in order to form successive layers of the object geometry. In some embodiments, a photo-curable resin described herein can be used in inkjet or coating applications. Cured polymeric materials may also be fabricated by "vat" processes in which light is used to selectively cure a vat or reservoir of the curable resin. Each layer of curable resin may be selectively exposed to light in a single exposure or by scanning a beam of light across the layer. Specific techniques that can be used herein can include stereolithography (SLA), Digital Light Processing (DLP) and two photon-induced photo-polymerization (TPIP).

In some embodiments, the methods disclosed herein use continuous direct fabrication to produce a device comprising the cured polymeric material. Such device can be an orthodontic appliance as described herein. In certain embodiments, the methods disclosed herein can comprise the use of continuous direct fabrication to produce a device (e.g., an orthodontic appliance) comprising, consisting essentially of, or consisting of the cured polymeric material. A non-limiting exemplary direct fabrication process can achieve continuous build-up of an object geometry by continuous movement of a build platform (e.g., along the vertical or Z-direction) during an irradiation phase, such that the hardening depth of the irradiated photo-polymer (e.g., an irradiated photo-curable resin, hardening during the formation of a cured polymeric material) is controlled by the movement speed. Accordingly, continuous polymerization of material (e.g., polymerization of a photo-curable resin into a cured polymeric material) on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which a liquid resin (e.g., a photo-curable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352), which reference is hereby incorporated by reference in its entirety for description of the process. Another example of continuous direct fabrication method can involve extruding a material composed of a curable liquid material or resin surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein can comprise the use of high temperature lithography to produce a device comprising the cured polymeric material. Such device can be an orthodontic appliance as described herein. In certain embodiments, the methods disclosed herein use high temperature lithography to produce a device comprising, consisting essentially of, or consisting of the cured polymeric material. "High temperature lithography," as used herein, may refer to any lithography-based photo-polymerization processes that involve heating photo-polymerizable material(s) (e.g., a photo-curable resin disclosed herein). The heating may lower the viscosity of the photo-curable resin before and/or during curing. Non-limiting examples of high-temperature lithography processes include those processes described in WO 2015/075094, WO 2016/078838 and WO 2018/032022. In some implementations, high-temperature lithography may involve applying heat to material to temperatures from about 50° C. to about 120° C., such as from about 90° C. to about 120° C., from about 100° C. to about 120° C., from about 105° C. to about 115° C., from about 108° C. to about 110° C., etc. The material may be heated to temperatures greater than about 120° C. It is noted other temperature ranges may be used without departing from the scope and substance of the inventive concepts described herein.

Since, in some cases, the polymerizable monomers of the present disclosure can, as part of a photo-curable resin, become co-polymerized in the polymerization process of a method according to the present disclosure, the result can be an optionally cross-linked polymer comprising moieties of one or more species of polymerizable monomer(s) as repeating units. In some cases, such polymer is a cross-linked polymer which, typically, can be suitable and useful for applications in orthodontic appliances.

In further embodiments, a method herein can comprise polymerizing a curable composition which comprises at least one multivalent monomer, which, upon polymerization, can furnish a cross-linked polymer which can comprise moieties originating from the polymerizable monomer(s) of the present disclosure as repeating units. In order to obtain cross-linked polymers which can be particularly suitable as orthodontic appliances, the at least one polymerizable species used in the method according to the present disclosure can be selected with regard to several thermomechanical properties of the resulting polymers. In some instances, a curable resin of the present disclosure can comprise one or more species of multivalent polymerizable monomers. In some cases, a polymerizable monomer of the present disclosure can also have cross-linking functionalities, and thus not only act as a reactive diluent with low vapor pressure, but also as a cross-linking agent during polymerization of a curable resin described herein. In other embodiments, a resin comprises a polymerizable monomer as described herein and a cross-linking monomer, wherein both monomers are different species (i.e., chemical entities).

IV. Appliances for Moving a Plurality of Teeth

Provided herein are appliances (e.g., expander appliances) that be used to expand a palate and/or arch of a patient. Such expander appliances can comprise one or more teeth-receiving portion(s). Thus, in some embodiments, the appliances of the present disclosure can also be well suited for moving one or more teeth of a patient, e.g., a first group of one or more teeth or and/or a second group of one or more teeth. In many embodiments, an appliance herein can be configured to move one or more teeth along a tooth movement vector comprising six degrees of freedom, in which three degrees of freedom are rotational and three degrees of freedom are translation.

The present disclosure provides orthodontic systems and related methods for expanding a palate or arch of a patient. Such orthodontic systems may also be used to design and provide improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof, for example. In some cases, the reinforced composites can comprise a polymer matrix reinforced with ceramic or metallic particles, for example. The appliance can be shaped in many ways, such as with thermoforming or direct fabrication as described herein, for example. Alternatively, or in combination, the appliance can be fabricated with machining such as an appliance fabricated from a block of material with computer numeric control machining. In some cases, the appliance is fabricated using a polymerizable monomer according to the present disclosure, for example, using the monomers as reactive diluents for curable resins.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
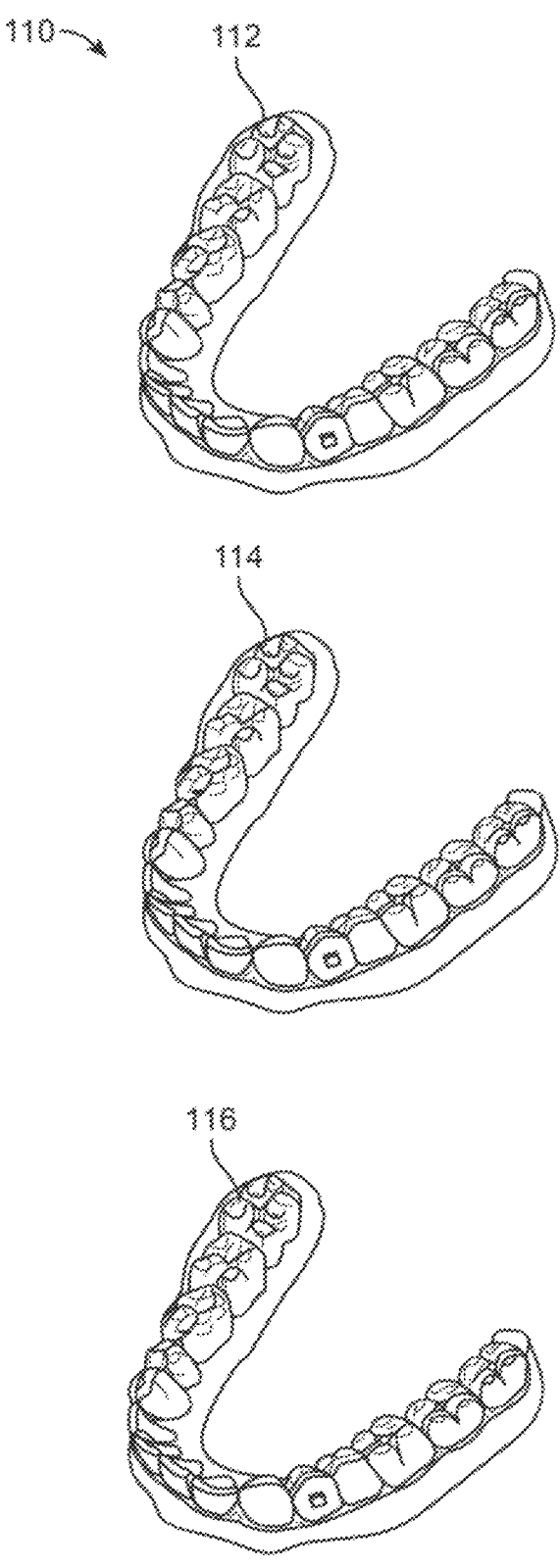
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photo-polymerization (e.g., stereolithography), in which an object is constructed layer by layer from a vat of liquid photo-polymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photo-polymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively, or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively, or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photo-polymerizable resin by forming a gradient of partially cured resin between the building surface of the object and a polymerization-inhibited "dead zone." In some embodiments, a semi-permeable membrane is used to control transport of a photo-polymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photo-polymerization, light curing, gas curing, laser curing, cross-linking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively, or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variability in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three dimensional data of the palate and upper arch; 2) The three dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
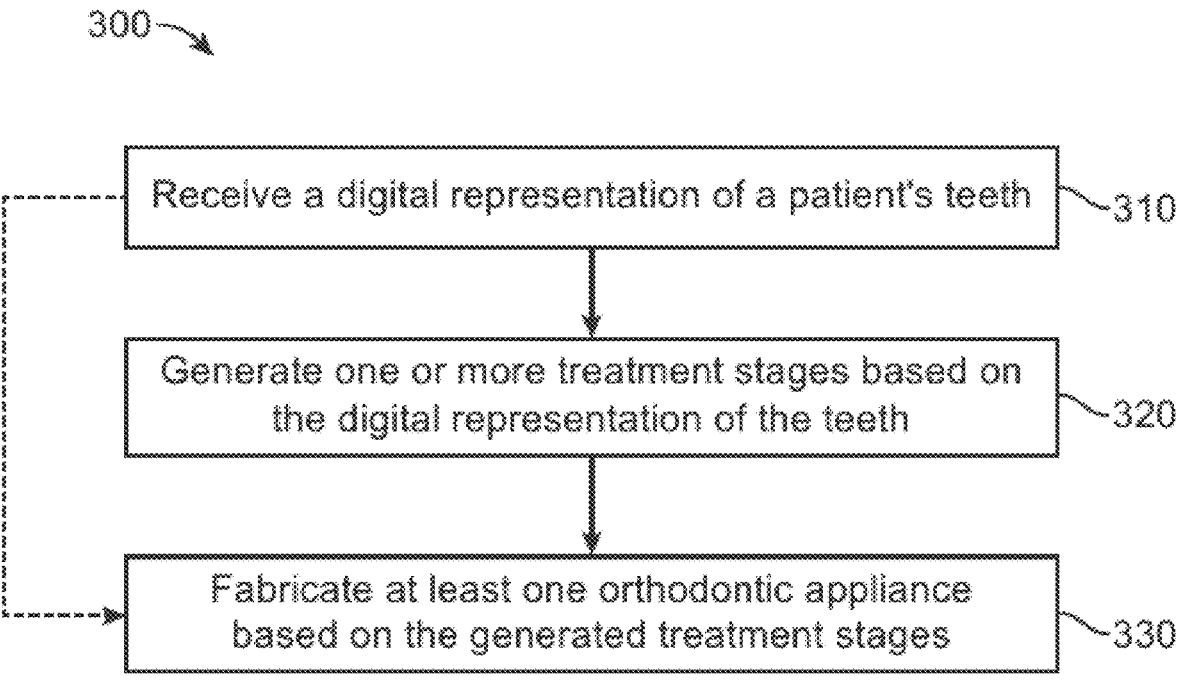
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

On-Track Treatment

Figure 4:
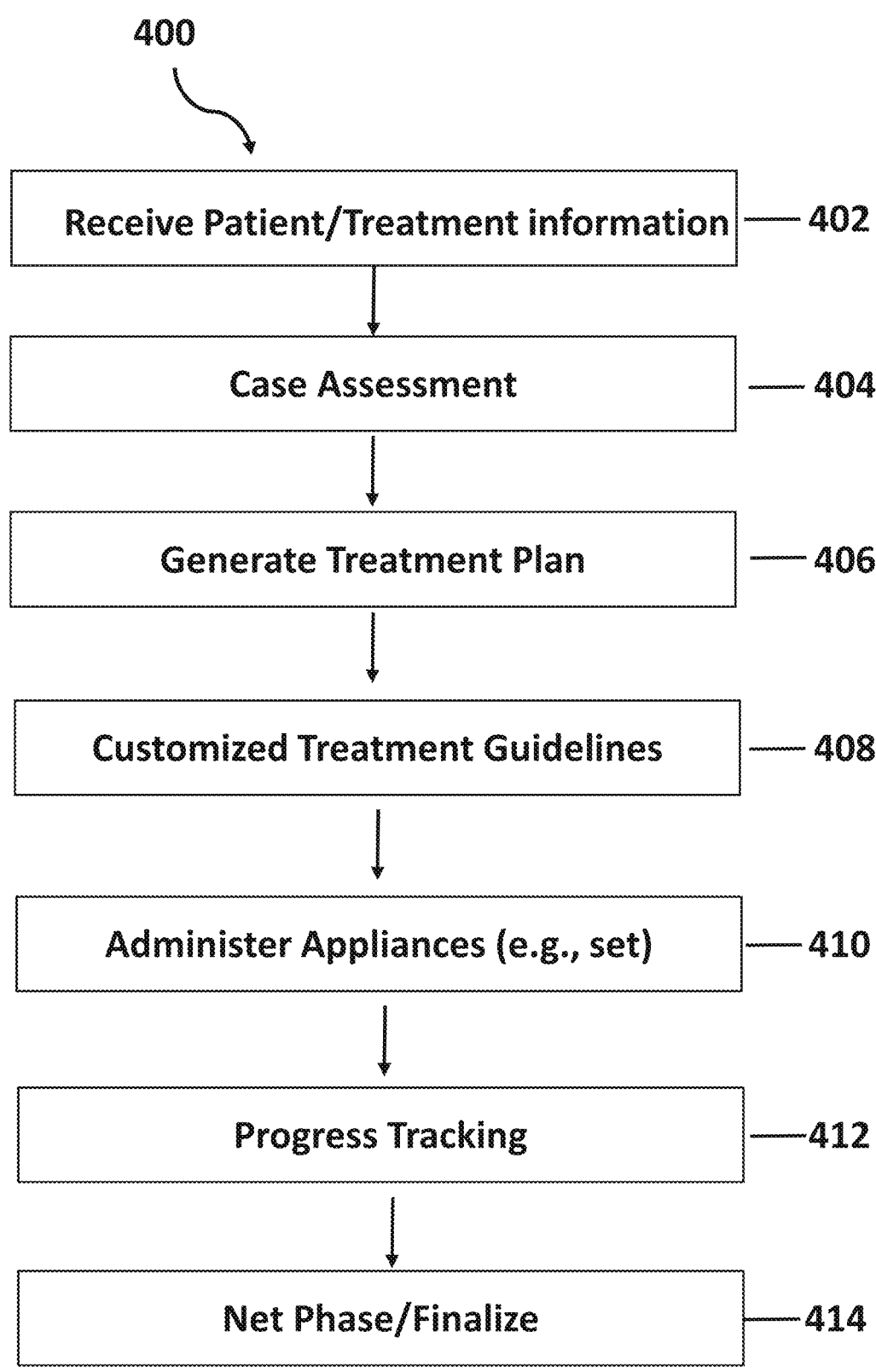
FIG. 4 shows generating and administering treatment according to an embodiment of the present disclosure.

Referring to FIG. 4, a process 400 according to the present disclosure is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information includes data comprising an initial arrangement of the patient's teeth, which includes obtaining an impression or scan of the patient's teeth prior to the onset of treatment and can further include identification of one or more treatment goals selected by the practitioner and/or patient. A case assessment can be generated (404) so as to assess the complexity or difficulty of moving the particular patient's teeth in general or specifically corresponding to identified treatment goals, and may further include practitioner experience and/or comfort level in administering the desired orthodontic treatment. In some cases, however, the assessment can include simply identifying particular treatment options (e.g., appointment planning, progress tracking, etc.) that are of interest to the patient and/or practitioner. The information and/or corresponding treatment plan includes identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan may include multiple phases of treatment, with a customized set of treatment guidelines generated that correspond to a phase of the treatment plan. The guidelines can include detailed information on timing and/or content (e.g., specific tasks) to be completed during a given phase of treatment, and can be of sufficient detail to guide a practitioner, including a less experienced practitioner or practitioner relatively new to the particular orthodontic treatment process, through the phase of treatment. Since the guidelines are designed to specifically correspond to the treatment plan and provide guidelines on activities specifically identified in the treatment information and/or generated treatment plan, the guidelines can be customized. The customized treatment guidelines are then provided to the practitioner so as to help instruct the practitioner as how to deliver a given phase of treatment. As set forth above, appliances can be generated based on the planned arrangements and can be provided to the practitioner and ultimately administered to the patient (410). The appliances can be provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in TABLE 1. If a patient's teeth have progressed at or within the threshold values, the progress is considered to be on-track. If a patient's teeth have progressed beyond the threshold values, the progress is considered to be off-track.

TABLE 1

| Type Movement | Difference Actual/Planned |
|---|---|
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |
| Extrusion | |
| Anterior | 0.75 mm |
| Posterior | 0.75 mm |
| Intrusion | |
| Anterior | 0.75 mm |
| Posterior | 0.75 mm |

TABLE 1-continued

| Type Movement | Difference Actual/Planned |
|---|---|
| Angulation | |
| Anterior | 5.5 degrees |
| Posterior | 3.7 degrees |
| Inclination | |
| Anterior | 5.5 degrees |
| Posterior | 3.7 degrees |
| Translation | |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

The patient's teeth are determined to be on track by comparison of the teeth in their current positions with teeth in their expected or planned positions, and by confirming the teeth are within the parameter variance disclosed in TABLE 1. If the patient's teeth are determined to be on track, then treatment can progress according to the existing or original treatment plan. For example, a patient determined to be progressing on track can be administered one or more subsequent appliances according to the treatment plan, such as the next set of appliances. Treatment can progress to the final stages and/or can reach a point in the treatment plan where bite matching is repeated for a determination of whether a patient's teeth are progressing as planned or if the teeth are off track.

In some embodiments, as further disclosed herein, this disclosure provides methods of treating a patient using a 3D printed orthodontic appliance. As a non-limiting example, orthodontic appliances comprising crystalline domains, polymer crystals, and/or materials that can form crystalline domains or polymer crystals can be 3D printed and used to reposition a patient's teeth. In certain embodiments, the method of repositioning a patient's teeth (or, in some embodiments, a singular tooth) comprises: generating a treatment plan for the patient, the plan comprising a plurality of intermediate tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some embodiments, producing the 3D printed orthodontic appliance uses the crystallizable resins disclosed further herein. On-track performance can be determined, e.g., from TABLE 1, above.

In some embodiments, the method further comprises tracking the progression of the patient's teeth along the treatment path after administration of the orthodontic appliance. In certain embodiments, the tracking comprises comparing a current arrangement of the patient's teeth to a planned arrangement of the teeth. As a non-limiting example, following the initial administration of the orthodontic appliance, a period of time passes (e.g., two weeks), a comparison of the now-current arrangement of the patient's teeth (i.e., at two weeks of treatment) can be compared with the teeth arrangement of the treatment plan. In some embodiments, the progression can also be tracked by comparing the current arrangement of the patient's teeth with the initial configuration of the patient's teeth. The period of time can be, for example, greater than 3 days, greater than 4 days, greater than 5 days, greater than 6 days, greater than 7 days, greater than 8 days, greater than 9 days, greater than 10 days, greater than 11 days, greater than 12 days, greater than 13 days, greater than 2 weeks, greater than 3 weeks, greater than 4 weeks, or greater than 2 months. In some embodiments, the period of time can be from at least 3 days to at most 4 weeks, from at least 3 days to at most 3 weeks, from at least 3 days to at most 2 weeks, from at least 4 days to at most 4 weeks, from at least 4 days to at most 3 weeks, or from at least 4 days to at most 2 weeks. In certain embodiments, the period of time can restart following the administration of a new orthodontic appliance.

In some embodiments, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the patient's teeth are on track with the treatment plan after a period of time of using an orthodontic appliance as disclosed further herein. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As disclosed further herein, orthodontic appliances disclosed herein have advantageous properties, such as increased durability, and an ability to retain resilient forces to a patient's teeth for a prolonged period of time. In some embodiments of the method disclosed above, the 3D printed orthodontic appliance has a retained repositioning force (i.e., the repositioning force after the orthodontic appliance has been applied to or worn by the patient over a period of time), and the retained repositioning force to at least one of the patient's teeth after the period of time is at least 10%, at least 20%, at least 30%, at least 40%, at least 50%, at least 55%, at least 60%, at least 65%, at least 70%, at least 75%, at least 80%, at least 85%, at least 90%, at least 95%, at least 96%, at least 97%, at least 98%, or at least 99% of the repositioning force initially provided to the at least one of the patient's teeth (i.e., with initial application of the orthodontic appliance). In some embodiments, the period of time is 1 day, 2 days, 3 days, 4 days, 5 days, 6 days, 7 days, 8 days, 9 days, 10 days, 11 days, 12 days, 13 days, 2 weeks, 3 weeks, 4 weeks, or greater than 4 weeks. In some embodiments, the repositioning force applied to at least one of the patient's teeth is present for a time period of less than 24 hours, from about 24 hours to about 2 months, from about 24 hours to about 1 month, from about 24 hours to about 3 weeks, from about 24 hours to about 14 days, from about 24 hours to about 7 days, from about 24 hours to about 3 days, from about 3 days to about 2 months, from about 3 days to about 1 month, from about 3 days to about 3 weeks, from about 3 days to about 14 days, from about 3 days to about 7 days, from about 7 days to about 2 months, from about 7 days to about 1 month, from about 7 days to about 3 weeks, from about 7 days to about 2 weeks, or greater than 2 months. In some embodiments, the repositioning force applied to at least one of the patient's teeth is present for about 24 hours, for about 3 days, for about 7 days, for about 14 days, for about 2 months, or for more than 2 months.

In some embodiments, the orthodontic appliances disclosed herein can provide on-track movement of at least one of the patient's teeth. On-track movement has been described further herein, e.g., at TABLE 1. In some embodiments, the orthodontic appliances disclosed herein can be used to achieve on-track movement of at least one of the patient's teeth to an intermediate tooth arrangement. In some embodiments, the orthodontic appliances disclosed herein can be used to achieve on-track movement of at least one of the patient's teeth to a final tooth arrangement.

In some embodiments, prior to moving, with the orthodontic appliance, at least one of the patient's teeth toward an intermediate arrangement or a final tooth arrangement, the orthodontic appliance has characteristics which are retained following the use of the orthodontic appliance. In some embodiments, prior to the moving step, the orthodontic appliance comprises a first flexural modulus. In certain embodiments, after the moving step, the orthodontic appliance comprises a second flexural modulus. In some embodiments, the second flexural modulus is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first flexural modulus. In some embodiments, the second flexural modulus is greater than 50% of the first flexural modulus. In some embodiments, this comparison is performed following a period of time in which the appliance is applied. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

In some embodiments, prior to the moving step, the orthodontic appliance comprises a first elongation at break. In certain embodiments, after the moving step, the orthodontic appliance comprises a second elongation at break. In some embodiments, the second elongation at break is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first elongation at break. In some embodiments, the second elongation at break is greater than 50% of the first elongation at break. In some embodiments, this comparison is performed following a period of time in which the appliance is applied. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As provided herein, the methods disclosed can use the orthodontic appliances further disclosed herein. The orthodontic appliances can be directly fabricated using, e.g., the crystallizable resins disclosed herein. In certain embodiments, the direct fabrication comprises cross-linking the crystallizable resin.

The appliances formed from the crystallizable resins disclosed herein provide improved durability, strength, and flexibility, which in turn improve the rate of on-track progression in treatment plans. In some embodiments, greater than 60%, greater than 70%, greater than 80%, greater than 90%, or greater than 95% of patients treated with the orthodontic appliances disclosed herein (e.g., an aligner) are classified as on-track in a given treatment stage. In certain embodiments, greater than 60%, greater than 70%, greater than 80%, greater than 90%, or greater than 95% of patients treated with the orthodontic appliances disclosed herein (e.g., an aligner) have greater than 50%, greater than 55%, greater than 60%, greater than 65%, greater than 70%, greater than 75%, greater than 80%, greater than 85%, greater than 90%, or greater than 95% of their tooth movements classified as on-track.

As disclosed further herein, the cured polymeric material contains favorable characteristics that, at least in part, stem from the presence of polymeric crystals. These cured polymeric materials can have increased resilience to damage, can be tough, and can have decreased water uptake when compared to similar polymeric materials. The cured polymeric materials can be used for devices within the field of orthodontics, as well as outside the field of orthodontics. For example, the cured polymeric materials disclosed herein can be used to make devices for use in aerospace applications, automobile manufacturing, the manufacture of prototypes, and/or devices for use in durable parts production.

V. Experimental Methods

In some embodiments, the stress relaxation of a material or device can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature of 37±2° C. at 100% relative humidity or a temperature of 37±2° C. in water.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. For example, an MCR 301 rheometer from Anton Paar may be used for rheological measurement in rotation mode (PP-25, 50 s-1, 50-115° C., 3° C./min).

Determining the water content when fully saturated at use temperature can comprise exposing the polymeric material to 100% humidity at the use temperature (e.g., 40° C.) for a period of 24 hours, then determining water content by methods known in the art, such as by weight.

In some embodiments, the presence of a crystalline phase and an amorphous phase provide favorable material properties to the polymeric materials. Property values of the cured polymeric materials can be determined, for example, by using the following methods: stress relaxation properties can be assessed using a Q850 instrument from TA Instruments, with a 3-point bending, according to ASTM D790; for example, stress relaxation can be measured at 37° C. and submerged in water, and reported as the remaining load after 24 hours, as either the percent (%) of initial load, and/or in MPa; storage modulus can be measured at 37° C. and is reported in MPa; $T_g$ of the cured polymeric material can be assessed using dynamic mechanical analysis (DMA) and is provided herein as the tan δ peak; tensile modulus, tensile strength, elongation at yield and elongation at break can be assessed according to ASTM D1708; and tensile strength at yield, elongation at break, tensile strength, and Young's modulus can be assessed according to ASTM D1708.

Figure 6:
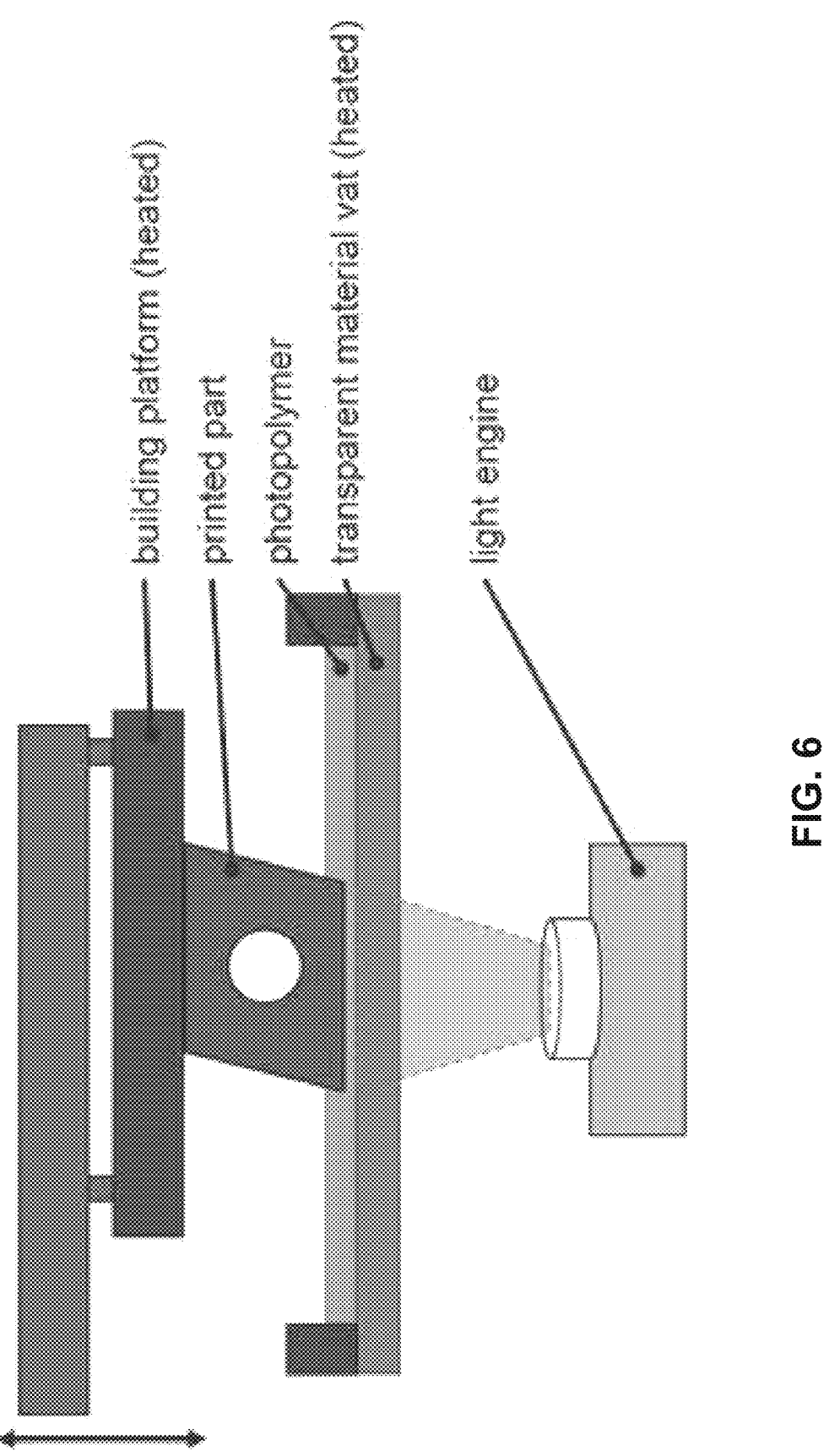
FIG. 6 shows a schematic configuration of an additive manufacturing device used for curing a curable composition of the present disclosure by using a 3D printing process.

Additive manufacturing or 3D printing processes for generating a device herein (e.g., an orthodontic appliance) can be conducted using a Hot Lithography apparatus prototype from Cubicure GmbH (Vienna, Austria), which can substantially be configured as schematically shown in FIG. 6. In such cases, a photo-curable composition (e.g., resin) according to the present disclosure can be filled into the transparent material vat of the apparatus shown in FIG. 6, which vat can be heated to 90-110° C. The building platform can be heated to 90-110° C., too, and lowered to establish holohedral contact with the upper surface of the curable composition. By irradiating the composition with UV radiation, which can be controlled to trace a predefined prototype design, and alternately raising the building platform, the composition can be cured layer by layer by a photopolymerization process according to the disclosure, resulting in a polymeric material according to present disclosure.

EXAMPLES

It is understood that the examples and embodiments described herein are for illustrative purposes only and are not intended to limit the scope of the claimed invention. It is also understood that various modifications or changes in light the examples and embodiments described herein will be suggested to persons skilled in the art and are to be included within the spirit and purview of this application and scope of the appended claims.

Example 1

Manufacture of a Multi-Material Expander Appliance

This example describes the design and manufacturing of an expander appliance of the present disclosure comprising a shell comprising a first material and a cavity in the palatal region comprising one or more gates to place a second material into the cavity.

A shell comprising a teeth-receiving portion and a palatal portion comprising a cavity was produced by additive manufacturing to generate the transparent shell shown in FIGS. 7A-B. The shell consisted of a first material—a polymeric material—which was produced via curing of a photo-curable composition that contained the following components: 60% by weight a low viscosity difunctional aliphatic polyester urethane methacrylate, and 40% by weight a difunctional aliphatic polyester urethane methacrylate. To this formulation 1 wt % photoinitiator (TPO) and 0.2 wt % UV-absorber (2,2'-dihydroxy-4-methoxybenzon-phenone) were added. As shown in FIGS. 7A-B, the cavity of the shell was filled with a second, thermocurable material, which has a lower light transparency than the shell. Upon 3D printing and cleaning of the shell, the second material was placed into the cavity via a syringe and subsequently thermocured.

The multi-material expander appliance produced in this example and shown in FIGS. 7A-B provides high stiffness and stress remaining in the palatal region due to the second material present in the palatal cavity of the shell, while providing an overall high toughness of the appliance to withstand multiple insertion and removal cycles and bites by the patient when worn.

Example 2

Design and Manufacture of a Multi-Material Expander Appliance

This example describes the design and manufacture of an expander appliance described in the present disclosure that can be used to expand a palate and/or arch of a patient and/or to move one or more teeth according to a treatment plan designed for such patient.

General Appliance Design

An exemplary design of such expander appliance is depicted in FIGS. 8A-B. FIGS. 8A-B shows the palatal region of such appliance as well as part of the teeth-receiving portion and a cross-sectional view of the palatal region. The appliance shell was 3D printed using a photo-curable composition (i.e., a first material) that comprised 60% by weight a low viscosity difunctional aliphatic poly-ester urethane methacrylate, and 40% by weight a difunctional aliphatic polyester urethane methacrylate. To this formulation 1 wt % photoinitiator (TPO) and 0.2 wt % UV-absorber (2,2'-dihydroxy-4-methoxybenzon-phenone) were added. The arrow indicates the palatal cavity of the appliance that can be filled with a second material once the shell comprising the cavity has been cured (and, e.g., post-cured). FIG. 10 shows a cross-sectional view of an appliance shell which palatal cavity was filled with a second material indicated by the orange colored region (indicated by arrow) in the palatal portion of the shell.

Palatal Cavity Design

FIG. 9 shows an exemplary shell configuration in which the palatal region comprised two gates, one for injecting the second material into the cavity (e.g., a filling gate or filling hole), and one to allow gas that is being replaced inside the cavity by the second material to escape the cavity (e.g., an air or gas removal gate). In instances where the second material is a curable, viscous resin, a 2-gate configuration can be used to (i) allow injection or syringing of the second material into the cavity, and (ii) to allow the gas (e.g., air) that is replaced by the second material inside the cavity to escape the cavity. FIG. 11 shows a lingual view of a produced appliance shell indicating 2 possible locations and sizes of injection gates for placing a second material (e.g., a thermoplastic) into a palatal cavity of an appliance shell.

These data indicate that the expander appliances of the present disclosure can be designed and produced in various configurations, e.g., comprising various cavity volumes, gate sizes and locations, and overall dimensions, parameters which can be adjusted based on a patient's treatment plan due to the convenient and scalable modular nature of the appliances described herein.

Example 3

Stress-Relaxation Testing of IPEs With and Without Palatal Fillings

This example describes the stress-relaxation testing of (i) nylon material as a positive reference material, (ii) an incremental palatal expander (IPE) appliance shell as described in EXAMPLES 1-2 with a thickness of about 700 μm and without a filling in its palatal cavity (122B neat), and (iii) the same IPE appliance shell with a filling in the palatal cavity, wherein the filling comprised the polymer TCDDMDMA and 1 wt % of the thermal initiator AIBN.

Figure 12:
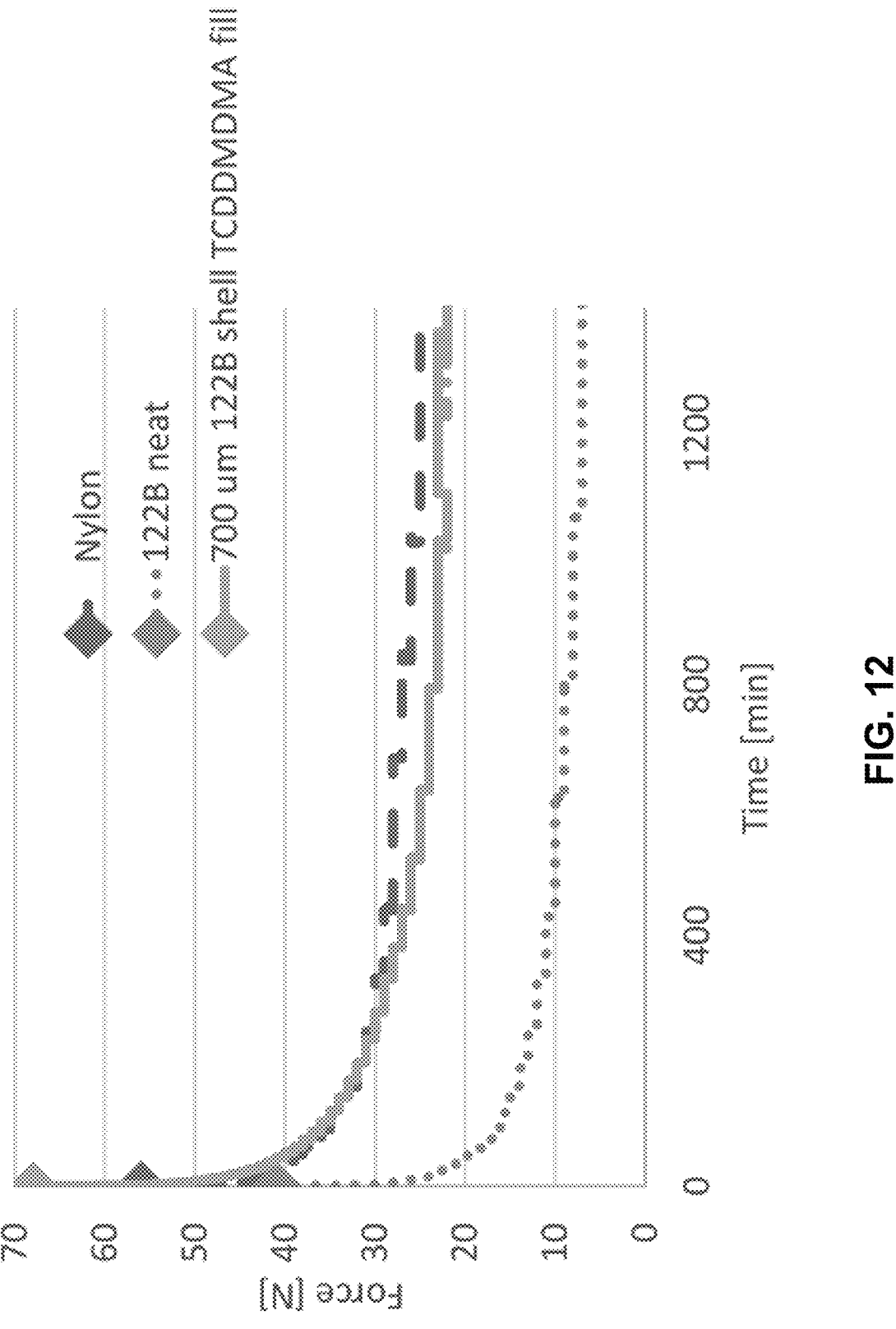
FIG. 12 illustrates a graph showing stress-relaxation performance of (i) nylon material as a reference material, (ii) an incremental palatal expander (IPE) appliance shell with a thickness of about 700 μm and without a filling in its palatal cavity (122B neat), and (iii) the same IPE appliance shell with a filling in the palatal cavity, wherein the filling comprised the polymer TCDDMDMA and 1 wt % of the thermal initiator AIBN.

The resulting stress-relaxation data shown in FIG. 12 demonstrate that an expander shell with a cured polymeric material filling inside its palatal cavity had nearly the same stress-relaxation profile as the positive control material nylon, whereas the same expander shell without the palatal filling showed significantly reduced stress-relaxation performance.

These data indicate that the palatal expander appliances of the present disclosure comprising a second material inside a palatal cavity can provide superior mechanical properties compared to conventional devices that consist mainly of a single shell material.

Example 4

Treatment Using an Orthodontic Appliance of this Disclosure

This example describes the use of an orthodontic expander appliance to move a patient's teeth according to a treatment plan. As described herein, in addition to expand a palate or arch of a patient, an expander appliance of this disclosure can be used to move one or more teeth of the patient according to a treatment plan. This example also describes the characteristics that the orthodontic appliance can have following its use, in contrast to its characteristics prior to use.

A patient in need of, or desirous of, a therapeutic treatment to rearrange at least one tooth has their teeth arrangement assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using photo-curable resins and methods disclosed further herein. In some embodiments, a plurality of orthodontic appliances is used, each of which can be fabricated using the photo-curable resins comprising one or more polymerizable compounds and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. The threshold difference values of a planned position of teeth to actual positions selected as indicating that a patient's teeth have progressed on-track are provided above in TABLE 1. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), remaining flexural stress, relative flexural modulus, and relative elongation at break can be determined.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by some embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

What is claimed is:

1. A multi-material orthodontic appliance, comprising:
   a shell comprising a first material, wherein the shell contains:
   a teeth-receiving portion; and
   a palatal portion comprising a cavity; and
   a second material located in the cavity, and
   wherein the first material comprises a first portion and a second portion, wherein the second portion is a thermo-cured polymeric material, and the first portion is not thermo-cured.

2. The multi-material orthodontic appliance of claim 1, wherein the first portion of the first material is a photo-cured polymeric material.

3. The multi-material orthodontic appliance of claim 2, wherein the first portion corresponds to at least 10%, 20%, 30%, 40%, 50%, 60%, 70%, 80%, or at least 90% by weight of the first material.

4. The multi-material orthodontic appliance of claim 1, wherein the second portion corresponds to at most 90%, 80%, 70%, 60%, 50%, 40%, 30%, 20%, or at most 10% by weight of the first material.

5. The multi-material orthodontic appliance of claim 1, wherein the first material comprises an interpenetrating polymer network (IPN).

6. The multi-material orthodontic appliance of claim 1, wherein the second material is a polymeric material comprising a thermo-cured polymer, a photo-cured polymer, or a combination thereof.

7. The multi-material orthodontic appliance of claim 1, wherein the first material is characterized by one or more of the following properties:
   (A) a tensile modulus of at least 200 MPa, 400 MPa, 600 MPa, 800 MPa, 1,000 MPa, 1,200 MPa, 1,400 MPa, or 1,600 MPa;
   (B) an elongation at break of at least 10%, 20%, 30%, 40%, 50%, 60%, 70%, 80%, 90%, 100%, 110%, 120%, 130%, 140%, 150%, or at least 160%;
   (C) a flexural modulus remaining of 10 MPa or more, 20 MPa or more, 50 MPa or more, 60 MPa or more, 70 MPa or more, 80 MPa or more, 90 MPa or more, 100 MPa or more, 125 MPa or more, 150 MPa or more, 175 MPa or more, 200 MPa or more, 225 MPa or more, 250 MPa or more, 275 MPa or more, 300 MPa or more, or 350 MPa or more, after 24 hours in a wet environment at 37° C.;
   (D) a water uptake of less than 25 wt %, less than 15 wt %, or less than 10 wt %, when measured after 24 hours in a wet environment at 37° C.;
   (E) is bioinert, biocompatible, or a combination thereof; and
   (F) comprises a plurality of polymeric phases, wherein at least one polymeric phase of the one or more polymeric phases has a $T_g$ of at least 60° C., 80° C., 90° C., 100° C., or at least 110° C.

8. The multi-material orthodontic appliance of claim 7, wherein the first material is characterized by two or more of the properties (A), (B), (C), (D), (E) and (F).

9. The multi-material orthodontic appliance of claim 7, wherein the first material is characterized by three or more of the properties (A), (B), (C), (D), (E) and (F).

10. The multi-material orthodontic appliance of claim 7, wherein the first material is characterized by four or more of the properties (A), (B), (C), (D), (E) and (F).

11. The multi-material orthodontic appliance of claim 7, wherein the first material is characterized by five or more of the properties (A), (B), (C), (D), (E) and (F).

12. The multi-material orthodontic appliance of claim 7, wherein the first material is characterized by all the properties (A), (B), (C), (D), (E) and (F).

13. The multi-material orthodontic appliance of claim 1, wherein the second material is characterized by one or more of the following properties:

(G) a flexural modulus of at least 70 MPa, 80 MPa, 90 MPa, 100 MPa or more in a standard 0.78 mm flat sheet geometry;

(H) a tensile modulus of at least 300 MPa, at least 400 MPa, at least 500 MPa, at least 600 MPa, or at least 700 MPa; and (I) a water uptake of less than 25 wt %, less than 15 wt %, or less than 10 wt %, when measured after 24 hours in a wet environment at 37° C.

14. The multi-material orthodontic appliance of claim 13, wherein the second material is characterized by two or more of the properties (G), (H), and (I).

15. The multi-material orthodontic appliance of claim 13, wherein the second material is characterized by all of properties (G), (H), and (I).

16. The multi-material orthodontic appliance of claim 1, wherein the shell is formed by 3D printing.

17. The multi-material orthodontic appliance of claim 1, wherein the second material has greater than 40% conversion of double bonds to single bonds compared to the unpolymerized resin, as measured by FTIR.

18. The multi-material orthodontic appliance of claim 2, wherein at least 50%, 70%, 90%, 95%, or at least 97% of visible light passes through the first photo-cured portion of the first material.

19. The multi-material orthodontic appliance of claim 1, wherein at most 30%, 20%, 10%, or at most 5% of visible light passes through the second thermo-cured portion of the first material.

20. A multi-material orthodontic appliance, comprising:

a shell comprising a first material, wherein the shell contains:

a teeth-receiving portion; and a palatal portion comprising a cavity; and a second material located in the cavity, and wherein the first material comprises an interpenetrating polymer network (IPN).

* * * * *